(12) United States Patent
Tanaka

(10) Patent No.: US 8,553,066 B2
(45) Date of Patent: Oct. 8, 2013

(54) CONFERENCE CONTROL DEVICE, CONFERENCE TERMINAL DEVICE, AND TELECONFERENCE SYSTEM

(75) Inventor: Akifumi Tanaka, Handa (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 264 days.

(21) Appl. No.: 13/183,499

(22) Filed: Jul. 15, 2011

(65) Prior Publication Data

US 2011/0267420 A1    Nov. 3, 2011

Related U.S. Application Data

(63) Continuation-in-part of application No. PCT/JP2009/070989, filed on Dec. 16, 2009.

(30) Foreign Application Priority Data

Jan. 15, 2009  (JP) ................................. 2009-006418

(51) Int. Cl.
*H04N 7/15* (2006.01)

(52) U.S. Cl.
CPC ..................................... *H04N 7/15* (2013.01)
USPC ................... 348/14.08; 348/14.09; 348/14.12

(58) Field of Classification Search
USPC .................... 348/14.01–14.16; 270/260–261; 709/204
See application file for complete search history.

(56) References Cited

U.S. PATENT DOCUMENTS

2002/0167586 A1* 11/2002 Liu ............................ 348/14.12
2004/0264390 A1   12/2004 Suzuki

FOREIGN PATENT DOCUMENTS

| JP | 2003-309832 | 10/2003 |
| JP | 2005-020520 | 1/2005 |
| JP | 2006-033396 | 2/2006 |
| JP | 2006-191283 | 7/2006 |
| JP | 2008-306518 | 12/2008 |

OTHER PUBLICATIONS

International Search Report received in International Application No. PCT/JP2009/070989 mailed Jan. 19, 2010.
International Preliminary Report on Patentability and Written Opinion mailed Jul. 19, 2011, PCT/JP2009/070989, English translation.
JP Office Action mailed Nov. 6, 2012, JP appln. 2009-006418, English translation.

* cited by examiner

*Primary Examiner* — Melur Ramakrishnaiah
(74) *Attorney, Agent, or Firm* — Banner & Witcoff, Ltd.

(57) ABSTRACT

A conference control device including a data transmission portion that transmits conferencing data from one of the conference terminal devices to another of the conference terminal devices, a first notification request portion that, in a case where a first request packet that requests establishing of a first communication path has been received from the one of the conference terminal devices while the conferencing data are transmitted by the data transmission portion, transmits a first notification request packet to the other of the conference terminal devices, and a first request response portion that, in a case where a first response packet providing notification of a port number for establishing the first communication path has been received from the other of the conference terminal devices, transmits to the one of the conference terminal devices a first request response packet containing information on a transmission source port number of the first response packet.

15 Claims, 23 Drawing Sheets

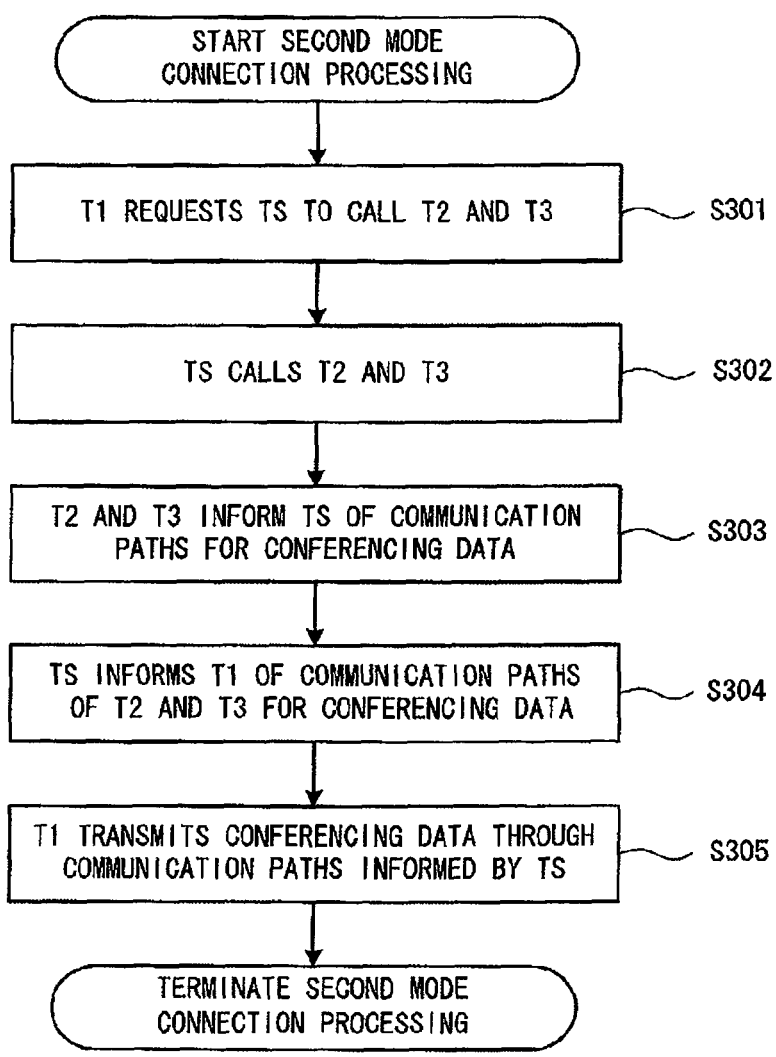

CONFERENCE CONTROL DEVICE, CONFERENCE TERMINAL DEVICE, AND TELECONFERENCE SYSTEM

CROSS-REFERENCE TO RELATED APPLICATION

This application is a continuation-in-part of International Application No. PCT/JP2009/070989, filed Dec. 16, 2009, which claims priority from Japanese Patent Application No. 2009-006418, filed on Jan. 15, 2009. The disclosure of the foregoing application is hereby incorporated by reference in its entirety.

BACKGROUND

The present disclosure relates to a conference control device, a conference terminal device, and a teleconference system.

In recent years, conferencing systems have come into widespread use that enable conferences to be held by linking participants in distant locations, for example, through a network such as the Internet or the like.

For example, a conferencing system is known that includes a plurality of conference terminal devices and a conference control device. With this conferencing system, conferencing data, which include audio data and video data, are transmitted and received among the conference terminal devices and the conference control device through an Internet Protocol (IP) network such as the Internet or the like, and a conference is conducted by displaying video or the like that corresponds to the conferencing data on a display portion or the like that is provided in each of the conference terminal devices and by outputting audio.

With this conferencing system, in order to achieve high-quality communication, for example, high quality must be maintained both for the video that is displayed on the display portion or the like of each of the conference terminal devices and for the audio that is output. Therefore, with this conferencing system, the necessary bandwidth for transmitting and receiving the high-quality conferencing data and the like is ensured.

SUMMARY

In the known conferencing system that is described above, the transmitting and receiving of the conferencing data among the conference terminal devices is performed through the conference control device. Therefore, if the traffic in and around the conference control device becomes congested, a problem may occur in the transmitting and receiving of the conferencing data.

Various exemplary embodiments of the broad principles derived herein provide a conference control device, a conference terminal device that is controlled by the conference control device, and a teleconference system that includes the conference control device and a plurality of conference terminal devices. Even in a case where network congestion occurs in and around the conference control device, the conference control device, the conference terminal device, and the teleconference system are able to limit the effect of the congestion on the transmitting and receiving of the conferencing data.

Exemplary embodiments herein provide a conference control device that controls teleconferencing among a plurality of conference terminal devices. The conference control device includes a data transmission portion, a first notification request portion, and a first request response portion. The data transmission portion transmits conferencing data that have been transmitted from one of the plurality of conference terminal devices to another of the plurality of conference terminal devices. The conferencing data includes at least one of audio data and video data. The first notification request portion, in a case where a first request packet has been received from the one of the conference terminal devices while the conferencing data that have been transmitted from the one of the conference terminal devices are being transmitted to the other of the conference terminal devices by the data transmission portion, transmits a first notification request packet to the other of the conference terminal devices. The first request packet requests establishing of a first communication path between the one of the conference terminal devices and the other of the conference terminal devices. The first notification request packet requests notification of a port number for establishing the first communication path. The first request response portion, in a case where a first response packet has been received from the other of the conference terminal devices, transmits a first request response packet to the one of the conference terminal devices. The first response packet provides the notification of the port number for establishing the first communication path. The first request response packet contains information on a transmission source port number of the first response packet.

Exemplary embodiments also provide a conference terminal device that is controlled by a conference control device. The conference terminal device includes a data transmission portion, a request transmission portion, and a first transmission control portion. The data transmission portion transmits conferencing data to one of the conference control device and another conference terminal device. The conferencing data includes at least one of audio data and video data. The request transmission portion, in a case where a bandwidth for communication with the conference control device has become less than a specified width while the conferencing data are being transmitted to the conference control device by the data transmission portion, transmits to the conference control device a request packet that requests establishing of a communication path with another conference terminal device. The first transmission control portion, in a case where a request response packet has been received from the conference control device in response to the request packet, the request response packet containing information on a transmission source port number from which a response packet has been transmitted to the conference control device from the other conference terminal device, causes the data transmission portion to start the transmission of the conferencing data to the other conference terminal device through the communication path, using the transmission source port number as a destination port number.

Exemplary embodiments further provide a teleconference system that includes a plurality of conference terminal devices and a conference control device that controls teleconferencing among the plurality of conference terminal devices. Each of the plurality of conference terminal devices includes a first data transmission portion, a first request transmission portion, and a first transmission control portion. The first data transmission portion transmits conferencing data to one of the conference control device and another of the conference terminal devices. The conferencing data includes at least one of audio data and video data. The first request transmission portion, in a case where a bandwidth for communication with the conference control device has become less than a specified width while the conferencing data are being transmitted to the conference control device by the first data transmission portion, transmits to the conference control device a first request packet that requests establishing of a first communication path with another of the conference terminal devices. The first transmission control portion, in a case where a first request response packet has been received from the conference control device in response to the first request packet, the first request response packet containing information on a transmission source port number from which a first response packet has been transmitted to the conference control device from the other of the conference terminal devices, causes the first data transmission portion to start the transmission of the conferencing data to the other of the conference terminal devices through the first communication path, using the transmission source port number as a destination port number. The conference control device includes a second data transmission portion, a first notification request portion, and a first request response portion. The second data transmission portion transmits the conferencing data that have been transmitted from one of the plurality of conference terminal devices to another of the plurality of conference terminal devices. The first notification request portion, in a case where the first request packet has been received from the one of the conference terminal devices, transmits to the other of the conference terminal devices a first notification request packet that requests notification of a port number for establishing the first communication path. The first request response portion, in a case where the first response packet that provides the notification of the port number for establishing the first communication path has been received from the other of the conference terminal devices, transmits the first request response packet to the one of the conference terminal devices.

BRIEF DESCRIPTION OF THE DRAWINGS

Exemplary embodiments will be described below in detail with reference to the accompanying drawings in which:

FIG. 23 is an explanatory figure of the second mode communication control procedure among the conference terminal devices.

DETAILED DESCRIPTION OF THE EXEMPLARY EMBODIMENTS

Hereinafter, various embodiments of the present disclosure will be explained with reference to the drawings. Note that in the explanation that follows, a video conference system that includes conference terminal devices that transmit and receive audio data and video data will be explained as an example of a conference system, but the present disclosure can also be applied to an audio conference system that includes conference terminal devices that transmit and receive audio data only.

1. First Embodiment

<1.1 Overview of Video Conference System>

First, a video conference system 1 according to a first embodiment will be explained with reference to the drawings.

<Configuration of Conference System>

Figure 1:
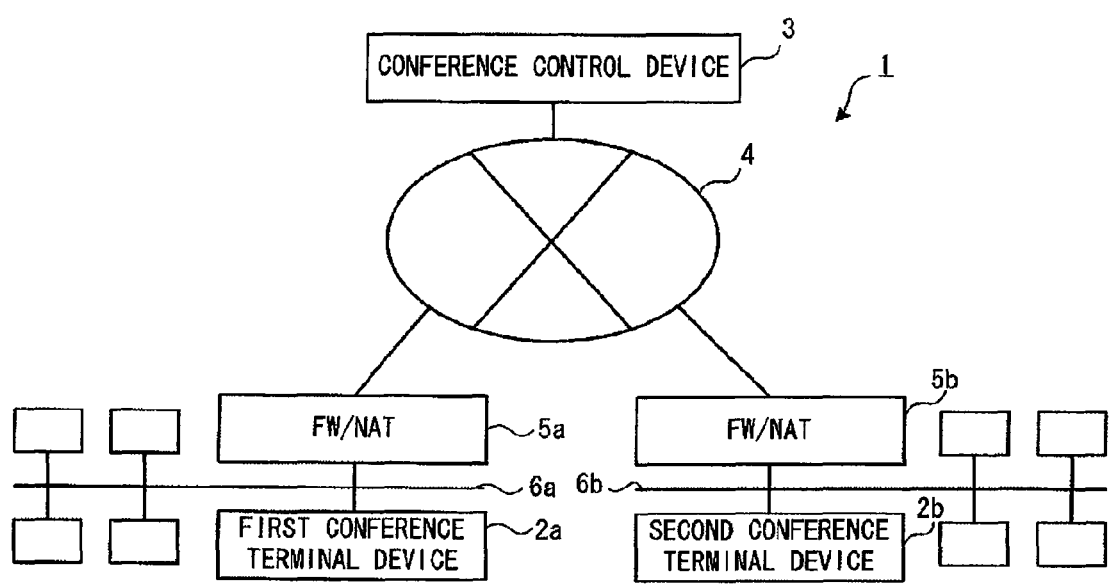
FIG. 1 is a figure that shows a configuration of a video conference system according to a first embodiment.

As shown in FIG. 1, a video conference system 1 according to the present embodiment includes a first conference terminal device 2a, a second conference terminal device 2b, and a conference control device 3 that are separately disposed in a plurality of locations. The first conference terminal device 2a, the second conference terminal device 2b, and the conference control device 3 perform transmission and receiving of data through a first network 4. The first network 4 may be a wide area network (WAN), as typified by the Internet.

The first and second conference terminal devices 2a, 2b are respectively connected to second networks 6a, 6b. Each of the second networks 6a, 6b may be a local area network (LAN). The first and second conference terminal devices 2a, 2b are respectively connected to the first network 4 through interface (IF) devices 5a, 5b, each of which includes a firewall and a network address translator (hereinafter jointly called a FW/NAT). Note that in the explanation that follows, there will be cases in which a conference terminal device that may be either one of the first and second conference terminal devices 2a, 2b is called the conference terminal device 2. There will also be cases in which an IF device that may be either one of the IF devices 5a, 5b is called the IF device 5. There will also be cases in which a second network that may be either one of the second networks 6a, 6b is called the second network 6. Note also that the first network 4 and the second networks 6a, 6b are all Internet Protocol (IP) networks.

Through the conference control device 3, the conference terminal device 2 transmits and receives, to and from the conference terminal device 2 that is its communication partner, data for video (hereinafter called the video data) that is captured by a camera (not shown in the drawings) and data for audio (hereinafter called the audio data) that is collected by a microphone (not shown in the drawings). This makes it possible for the conference participants to use the video conference system 1 to conduct a conference with participants in other locations. Note that in the explanation that follows, the video data and the audio data are collectively called the conferencing data.

The conference control device 3 is provided with functions that include a gatekeeper function that performs call control, terminal control, and the like, and a traversal server function that performs relaying of the conferencing data between the conference terminal devices 2 that are connected through the FW/NAT. Note that in the video conference system 1, the traversal server function, in accordance with the ITU-T Recommendations H.460.18/19, is capable of implementing a first mode that performs the transmitting and receiving of the conferencing data through the conference control device 3 and a second mode that performs the transmitting and receiving of the conferencing data without going through the conference control device 3.

Note also that in the video conference system 1, while the conference is proceeding by the transmitting and receiving of the conferencing data between the conference terminal devices 2 through the conference control device 3, if the communication bandwidth between the conference terminal devices 2 and the conference control device 3 becomes less than a specified width, the conferencing data are directly transmitted and received between the conference terminal devices 2.

This makes it possible for the video conference system 1 to prevent a deterioration in the quality of the conference, because the transmitting and receiving of the conferencing data are accomplished by direct communication between the conference terminal devices 2, even in a case where a problem has occurred in the communication between the conference terminal devices 2 and the conference control device 3.

Furthermore, even in a case where each of the conference terminal devices 2 is connected to the first network 4 through the IF device 5 that has the FW/NAT, direct communication can be made possible by opening a communication path between the conference terminal devices 2, as explained below.

Note that even in a case where the conferencing data are transmitted and received by direct communication between the conference terminal devices 2, a communication session is established between the conference control device 3 and the conference terminal devices 2, and the conference control device 3 is able to perform the call control and the communication control for the conference terminal devices 2.

<Communication Control Method Between the Conference Terminal Devices>

In the video conference system 1, if the communication bandwidth between the conference terminal devices 2 and the conference control device 3 becomes less than the specified width, a communication path between the conference terminal devices 2 is established in accordance with the procedure that is described below.

An example will be explained of a case where, in a state in which communication paths have been established between the first and second conference terminal devices 2a, 2b and the conference control device 3, the bandwidth of a conferencing data transmission path from the first conference terminal device 2a to the second conference terminal device 2b becomes less than the specified width. In the drawings, the conference terminal device 2 is labeled "TA", the first conference terminal device 2a is labeled "T1", the second conference terminal device 2b is labeled "T2", and the conference control device 3 is labeled "TS". Note that the term "packet" ordinarily means one IP packet, but it may also mean a packet that contains a plurality of IP packets.

Figure 2:
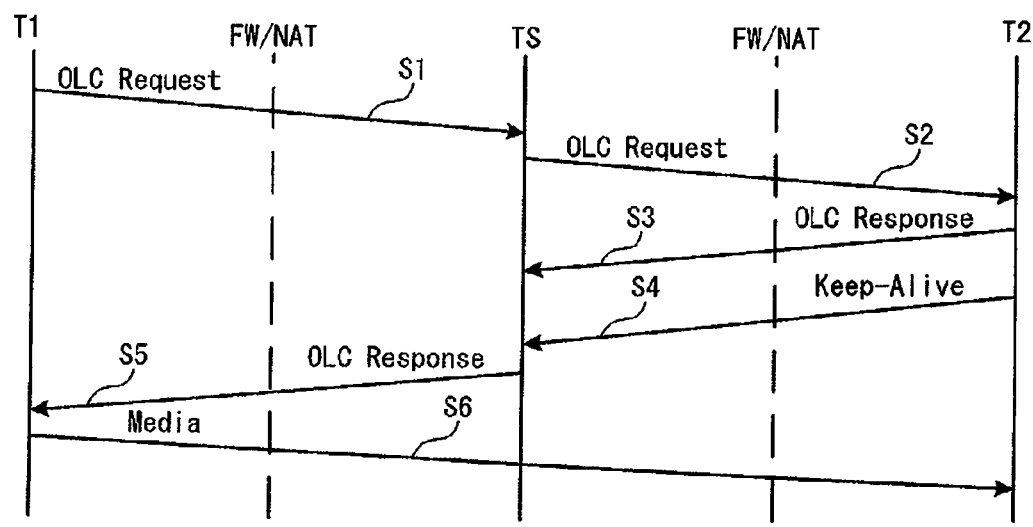
FIG. 2 is an explanatory figure of a second mode communication control procedure among conference terminal devices.

When the bandwidth of the conferencing data transmission path from the first conference terminal device 2a to the second conference terminal device 2b becomes less than the specified width, the first conference terminal device 2a stops transmitting the conferencing data to the conference control device 3 and transmits an Open Logical Channel Request packet (hereinafter called the OLC Request packet) to the conference control device 3 (Step S1), as shown in FIG. 2. This OLC Request packet is a request packet that requests the opening of a communication path to the second conference terminal device 2b. To say that the bandwidth becomes less than the specified width means, for example, that an actual communication bandwidth becomes less than 50% of a communication bandwidth that has been set between the conference terminal devices 2 and the conference control device 3. In a case where the communication bandwidth that has been set is 1 Mbps, the bandwidth can be determined to have become less than the specified width when the actual bandwidth becomes less than 500 kbps.

Upon receiving the OLC Request packet from the first conference terminal device 2a, the conference control device 3 transmits an OLC Request packet to the second conference terminal device 2b (Step S2). This OLC Request packet is a notification request packet that requests notification of a port number for establishing a communication path, in order to establish a communication path from the first conference terminal device 2a to the second conference terminal device 2b.

Upon receiving the OLC Request packet from the conference control device 3, the second conference terminal device 2b transmits an Open Logical Channel Response packet (hereinafter called the OLC Response packet) to the conference control device 3 (Step S3). This OLC Response packet is a response packet that indicates that the OLC Request packet was received.

Next, the second conference terminal device 2b transmits a Keep-Alive packet to the conference control device 3 (Step S4). The Keep-Alive packet is a response packet in which the port number for establishing the communication path is set as a transmission source port number. Note that the Keep-Alive packet is transmitted by the second conference terminal device 2b at prescribed intervals until the communication path with the first conference terminal device 2a is established. Based on the transmission source IP address and the transmission source port number of the Keep-Alive packet, the conference control device 3 detects the IP address and the transmission source port number of the IF device 5 on the first network 4 side that correspond to the IP address and the transmission source port number of the second conference terminal device 2b on the first network 4 side.

With the Keep-Alive packet, the FW/NAT in the IF device 5b that is located on the second conference terminal device 2b side associates the second network 6b side IP address and port number of the second conference terminal device 2b with the first network 4 side IP address and port number.

Figure 3:
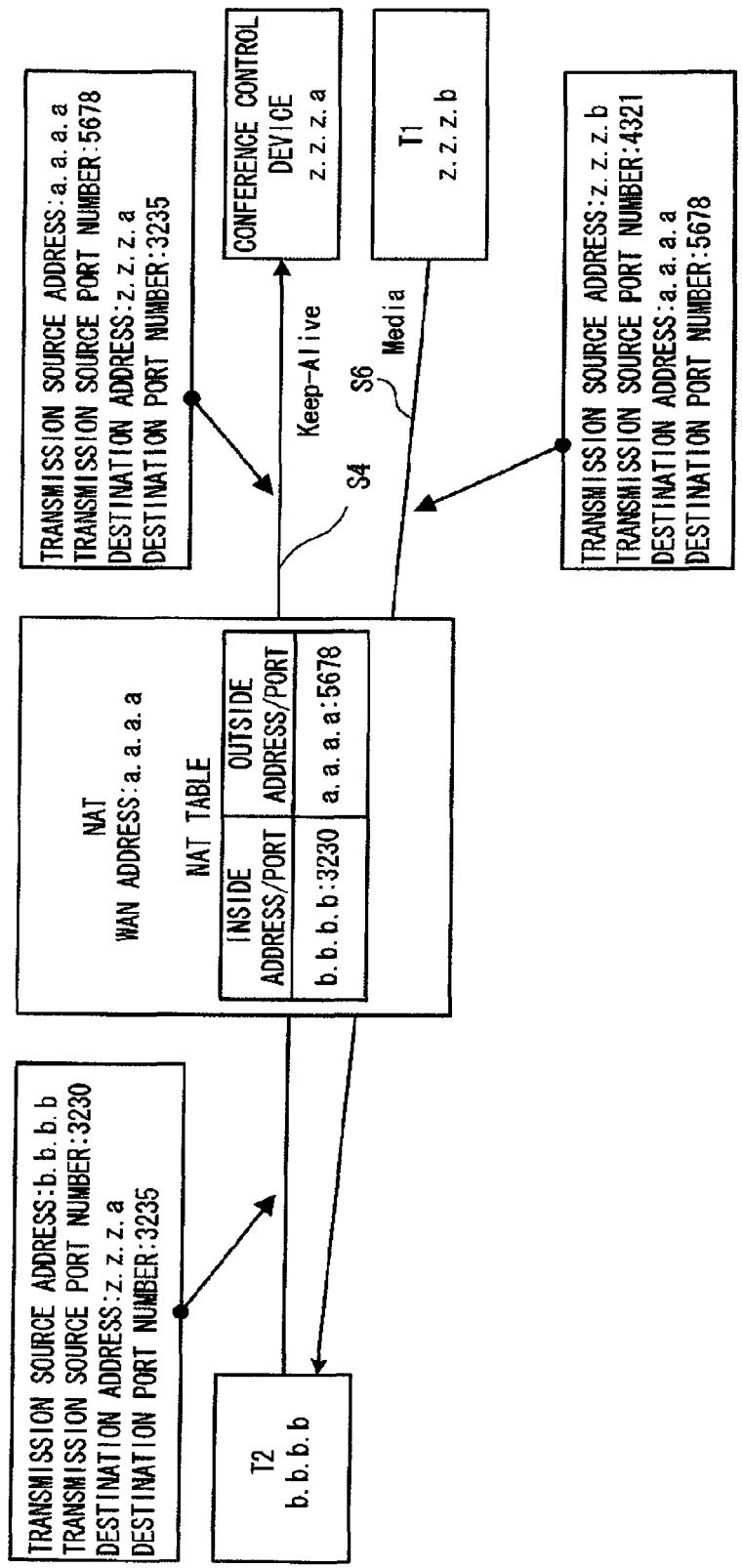
FIG. 3 is an explanatory figure of a NAT table for an interface device.

For example, assume that the second network 6b side IP address of the second conference terminal device 2b is "b.b.b.b" and that the port number for establishing the communication path is "3230". Assume also that, according to the Keep-Alive packet that is transmitted from the second conference terminal device 2b to the conference control device 3 through the IF device 5b, the first network 4 side IP address of the IF device 5b is "a.a.a.a" and the port number is "5678", for example. At this time, a NAT table like that shown in FIG. 3 is set up in the IF device 5b.

Upon receiving the Keep-Alive packet from the second conference terminal device 2b, the conference control device 3 transmits an OLC Response packet to the first conference terminal device 2a (Step S5). This OLC Response packet is a request response packet that contains information on the transmission source port number for the Keep-Alive packet that the conference control device 3 received.

Upon receiving the OLC Response packet from the conference control device 3, the first conference terminal device 2a starts transmitting the conferencing data to the second conference terminal device 2b, using as a destination port number the Keep-Alive packet transmission source port number that is contained in the OLC Response packet (Step S6).

At this time, the second network 6b side IP address and the port number of the second conference terminal device 2b are associated with the first network 4 side IP address and the port number in the FW/NAT in the IF device 5b for the second conference terminal device 2b, as described above. Therefore, the conferencing data that are transmitted from the first conference terminal device 2a pass through the FW/NAT on the second conference terminal device 2b side and are received by the second conference terminal device 2b. Thus the conferencing data communication path from the first conference terminal device 2a to the second conference terminal device 2b is established. This makes it possible for the conferencing data to be transmitted directly from the first conference terminal device 2a to the second conference terminal device 2b through the first network 4.

For example, in the case where the NAT table has been set in the IF device 5b as shown in FIG. 3, the conferencing data for which the destination IP address is "a.a.a.a" and the destination port number is "5678" are transmitted from the first conference terminal device 2a to the IF device 5b. At this time, based on the set NAT table, the IF device 5b converts the destination IP address to "b.b.b.b" and the destination port number to "3230", then outputs the conferencing data to the second network 6. The conferencing data thus arrive at the second conference terminal device 2b.

Note that in the example that is described above, if the communication bandwidth for the conferencing data transmission path from the first conference terminal device 2a through the conference control device 3 to the second conference terminal device 2b becomes less than the specified width, the first conference terminal device 2a halts the transmission of the conferencing data to the conference control device 3, but the following method may also be used. The transmission of the conferencing data to the conference control device 3 is halted only after the conferencing data communication path from the first conference terminal device 2a to the second conference terminal device 2b is established, and the transmission of the conferencing data to the second conference terminal device 2b is then started. This makes it possible to shorten the time that the transmission of the conferencing data is interrupted when the communication path is switched, such that the communication path can be switched more appropriately.

Figure 4:
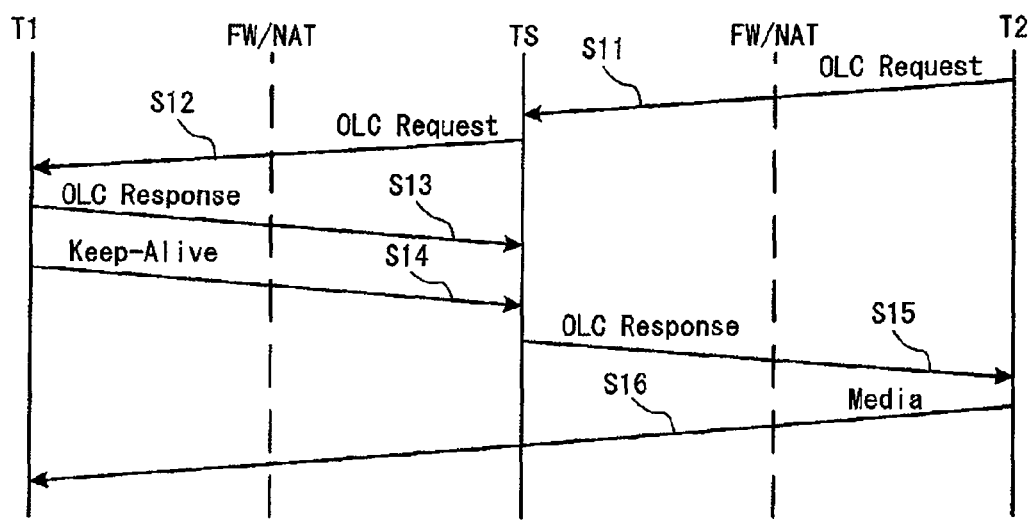
FIG. 4 is an explanatory figure of the second mode communication control procedure among the conference terminal devices.

Up to this point, the procedure for establishing the conferencing data communication path from the first conference terminal device 2a to the second conference terminal device 2b has been explained, but the conferencing data communication path from the second conference terminal device 2b to the first conference terminal device 2a is also established by the same sort of procedure (Steps S11 to S16), as shown in FIG. 4.

Figure 5:
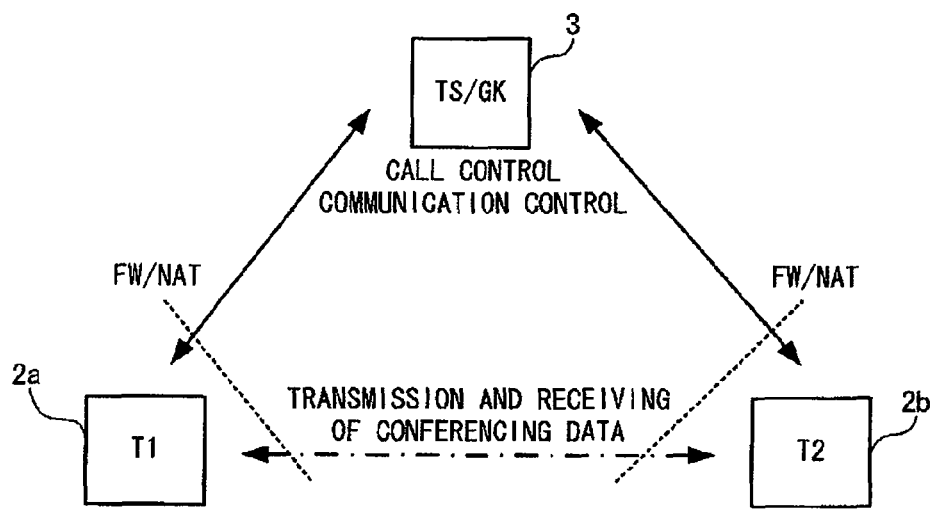
FIG. 5 is an explanatory figure of second mode communication paths in the video conference system.

Thus the performing of the procedures at Steps S1 to S6 and S11 to S16 enables the direct transmission and receiving of the conferencing data between the first conference terminal device 2a and the second conference terminal device 2b, as shown in FIG. 5. Nonetheless, call control and other communication control continue to be performed through the conference control device 3, in the same manner as before the procedures described above were performed.

Note that the conference control device 3 may also change the timings of the transmissions of the OLC Response packets to the first conference terminal device 2a and the second conference terminal device 2b, that is, the timings of Step S5 and Step S15, such that they become the same. This makes it possible for the communication paths between the first conference terminal device 2a and the second conference terminal device 2b to be established in both directions at the same time. This in turn makes it possible for the timings of the conferencing data transmission and receiving processing by the first and second conference terminal devices 2a, 2b to be synchronized, such that the processing does not become unduly complicated.

Furthermore, when the processing at Step S6 and Step S16 is performed and the conferencing data are transmitted and received between the first conference terminal device 2a and the second conference terminal device 2b without passing through the conference control device 3, the conference control device 3 performs the processing that is described below.

The conference control device 3 determines whether the communication bandwidths between the first and second conference terminal devices 2a, 2b can each be ensured to be not less than the specified width. The determination as to whether the communication bandwidths can be ensured to be not less than the specified width is made by transmitting test data at fixed intervals from the conference control device 3 to each of the first and second conference terminal devices 2a, 2b, then determining the communication bandwidths based on the communication rate for the test data (the volume of data communicated per unit time).

In a case where it is determined that the communication bandwidths can be ensured to be not less than the specified width, the conference control device 3 transmits requests to the first conference terminal device 2a and the second conference terminal device 2b to perform the processing that establishes the communication paths between the first conference terminal device 2a and the second conference terminal device 2b through the conference control device 3. The communication paths through the conference control device 3 are thus established.

The processing that establishes the communication paths through the conference control device 3 is performed in accordance with the procedure that is prescribed by the ITU-T Recommendations H.460.18/19, which is described in detail below. Note that in this case, the establishing of the communication path that is used for transmitting the conferencing data from the first conference terminal device 2a to the second conference terminal device 2b will be explained.

Figure 6:
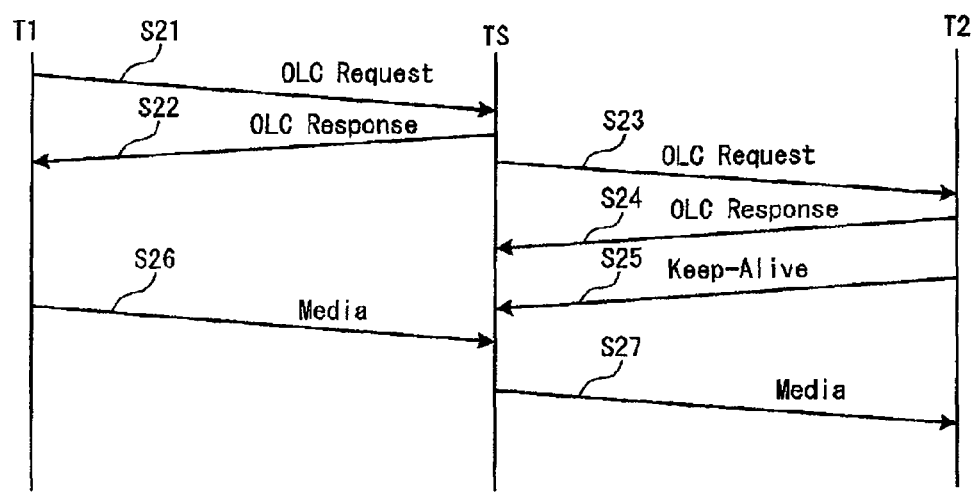
FIG. 6 is an explanatory figure of a first mode communication control procedure among the conference terminal devices.

As shown in FIG. 6, the first conference terminal device 2a transmits an OLC Request packet to the conference control device 3 (Step S21). This OLC Request packet is a request packet that requests the establishing of the communication path with the second conference terminal device 2b, which is the communication partner of the first conference terminal device 2a.

Upon receiving the OLC Request packet from the first conference terminal device 2a, the conference control device 3 transmits an OLC Response packet to the first conference terminal device 2a (Step S22). This OLC Response packet contains information on the destination port number of the conference control device 3 as the port number for establishing the communication path for receiving the conferencing data from the first conference terminal device 2a.

Upon receiving the OLC Response packet from the conference control device 3, the first conference terminal device 2a sets the destination port number to the transmission source port number of the OLC Response packet and transmits the conferencing data to the conference control device 3 (Step S26).

Upon receiving the OLC Response packet from the first conference terminal device 2a, the conference control device 3 also transmits an OLC Request packet to the second conference terminal device 2b (Step S23). This OLC Request packet is a notification request packet that requests notification of the port number for establishing the communication path. The port number for establishing the communication path is the port number of the second conference terminal device 2b that will be used for establishing the communication path from the conference control device 3 to the second conference terminal device 2b.

Upon receiving the OLC Request packet from the conference control device 3, the second conference terminal device 2b transmits an OLC Response packet to the conference control device 3 (Step S24). This OLC Response packet is a response packet that indicates that the OLC Request packet was received. The second conference terminal device 2b also transmits a Keep-Alive packet to the conference control device 3 (Step S25). This Keep-Alive packet is a response packet in which the port number for establishing the communication path is set as the transmission source port number. In accordance with the Keep-Alive packet, the FW/NAT that is located on the second conference terminal device 2b side associates the second network 6 side IP address and the port number of the second conference terminal device 2b with the first network 4 side IP address and the port number (refer to FIG. 3).

Upon receiving the Keep-Alive packet from the second conference terminal device 2b, the conference control device 3 starts transmitting the conferencing data to the second conference terminal device 2b, using the transmission source port number of the Keep-Alive packet as the destination port number (Step S27). At this time, in the FW/NAT on the second conference terminal device 2b side, the second network 6 side IP address and port number of the second conference terminal device 2b are associated with the first network 4 side IP address and port number, as described above. Therefore, the conferencing data that are transmitted from the conference control device 3 pass through the FW/NAT for the second conference terminal device 2b and are received by the second conference terminal device 2b.

Figure 7:
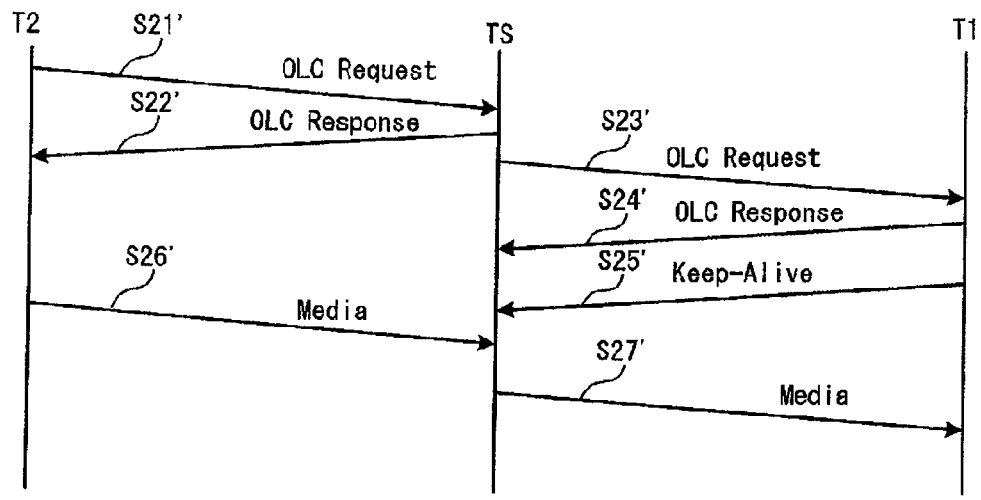
FIG. 7 is an explanatory figure of the first mode communication control procedure among the conference terminal devices.

The communication path that is used for transmitting the conferencing data from the second conference terminal device 2b to the first conference terminal device 2a is also established by performing the same sort of procedure, as in Steps S21' to S27' that are shown in FIG. 7. The performing of the procedures in this manner at Steps S21 to S27 and S21' to S27' causes the transmitting and receiving of the conferencing data, the call control, and other communication control to be conducted through the conference control device 3.

Note that the processing at Steps S1 to S6 above differs from the processing at Steps S21, S23 to S25, and S22 only in that the timing of some of the packet transmissions and the contents of some of fields are different. It is therefore possible to perform the processing at Steps S1 to S6 easily simply by changing a portion of the processing that is performed in accordance with the ITU-T Recommendations H.460.18/19.

<1.2 Explanation of Specific Configuration and Operation of the Conference Terminal Device 2>

Hereinafter, a specific example of the configuration and operation of the conference terminal device 2 that is described above will be explained.

<Configuration of the Conference Terminal Device 2>

First, the configuration of the conference terminal device 2 will be explained.

Figure 9:
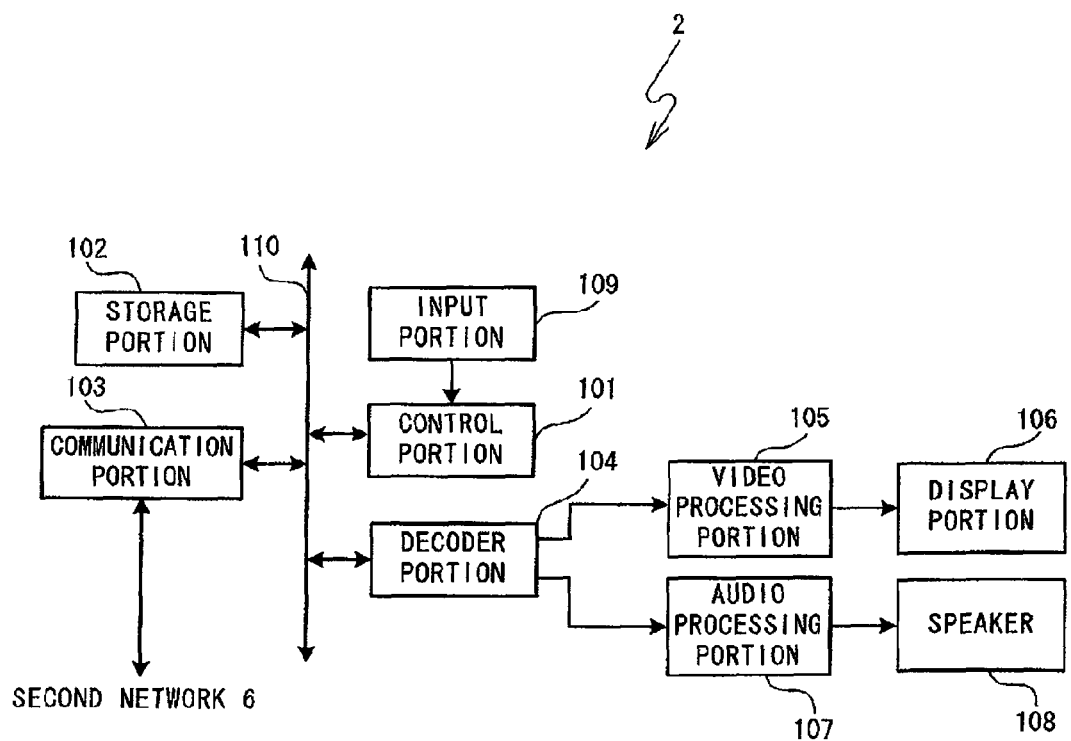
FIG. 9 is a figure that shows a configuration of the conference terminal device.

Both a special-purpose computer and a general-purpose personal computer can be used for the conference terminal device 2. As shown in FIG. 9, the conference terminal device 2 includes a control portion 101, a storage portion 102, a communication portion 103, a decoder portion 104, a video processing portion 105, a display portion 106, an audio processing portion 107, a speaker 108, and an input portion 109. The control portion 101, the storage portion 102, the communication portion 103, and the decoder portion 104 are connected to one another through a system bus 110. The storage portion 102 stores various types of setting values, default values, and the like. The communication portion 103 transmits and receives the conferencing data and control data to and from the conference control device 3 and the other conference terminal device 2 through the second network 6. The decoder portion 104 sequentially decodes the conferencing data that are received through the communication portion 103. The video processing portion 105 takes video data within the conferencing data that have been decoded by the decoder portion 104 and performs processing that converts the video data into information that can be displayed by the display portion 106. The display portion 106 includes a liquid crystal display (LCD) device or the like that displays video based on the output from the video processing portion 105. The audio processing portion 107 takes audio data within the conferencing data that have been decoded by the decoder portion 104 and performs processing that converts the audio data into information that can be output in the form of sound waves by the speaker 108. The speaker outputs the sound waves based on the output from the audio processing portion 107. The input portion 109 includes a mouse, a keyboard, or the like.

The control portion 101 includes a central processing unit (CPU), a non-volatile memory (for example, a flash memory), and a random access memory (RAM). An information processing program for connecting the conference terminal device 2 with the conference control device 3 and the other conference terminal device 2 to transmit and receive the conferencing data and the control data is stored in the non-volatile memory. The CPU performs the processing that is described below by reading and executing the information processing program that is stored in the non-volatile memory.

For example, through the communication portion 103, the CPU transmits to the conference control device 3 an OLC Request packet that requests the establishing of a communication path with the other conference terminal device 2. If the bandwidth for communicating with the conference control device 3 becomes less than the specified width while the transmitting and receiving of the conferencing data to and from the conference control device 3 are being performed by the communication portion 103, for example, the CPU halts the transmitting and receiving of the conferencing data to and from the conference control device 3 and transmits an OLC Request packet that is a notification request packet.

When the OLC Request packet is received through the communication portion 103, for example, the CPU transmits a Keep-Alive packet to the conference control device 3. The OLC Request packet is a notification request packet that requests notification of a port number for establishing a communication path, in order to establish a communication path from the conference control device 3 to the conference terminal device 2. The Keep-Alive packet is a response packet in which the port number for establishing the communication path is set as the transmission source port number. The port number for establishing the communication path is a port number for receiving the conferencing data from the other conference terminal device 2.

When an OLC Response packet is received, for example, the CPU starts transmitting the conferencing data to the other conference terminal device 2 through the communication portion 103, transmitting the conferencing data in the form of sequential packets. At this time, the CPU defines the destination port number as the Keep-Alive packet transmission source port number that is contained in the received OLC Response packet. The OLC Response packet is a request response packet in response to the OLC Request packet, and it is received from the conference control device 3 through the communication portion 103.

Note that the information processing program may be downloaded through the communication portion 103 to the non-volatile memory in the control portion 101 from, for example, one of the conference control device 3 and another server device that is connected to the first network 4. The information processing program may also be recorded in a storage medium such as a CD-R, a DVD-R, or the like, and may be read into the non-volatile memory in the control portion 101 through a storage medium drive that is not shown in the drawings.

<Operation of the Conference Terminal Device 2>

The operation of the conference terminal device 2 that is configured as described above will be explained in detail. Note that the various types of processing described below are performed by the control portion 101 of the conference terminal device 2.

Figure 10:
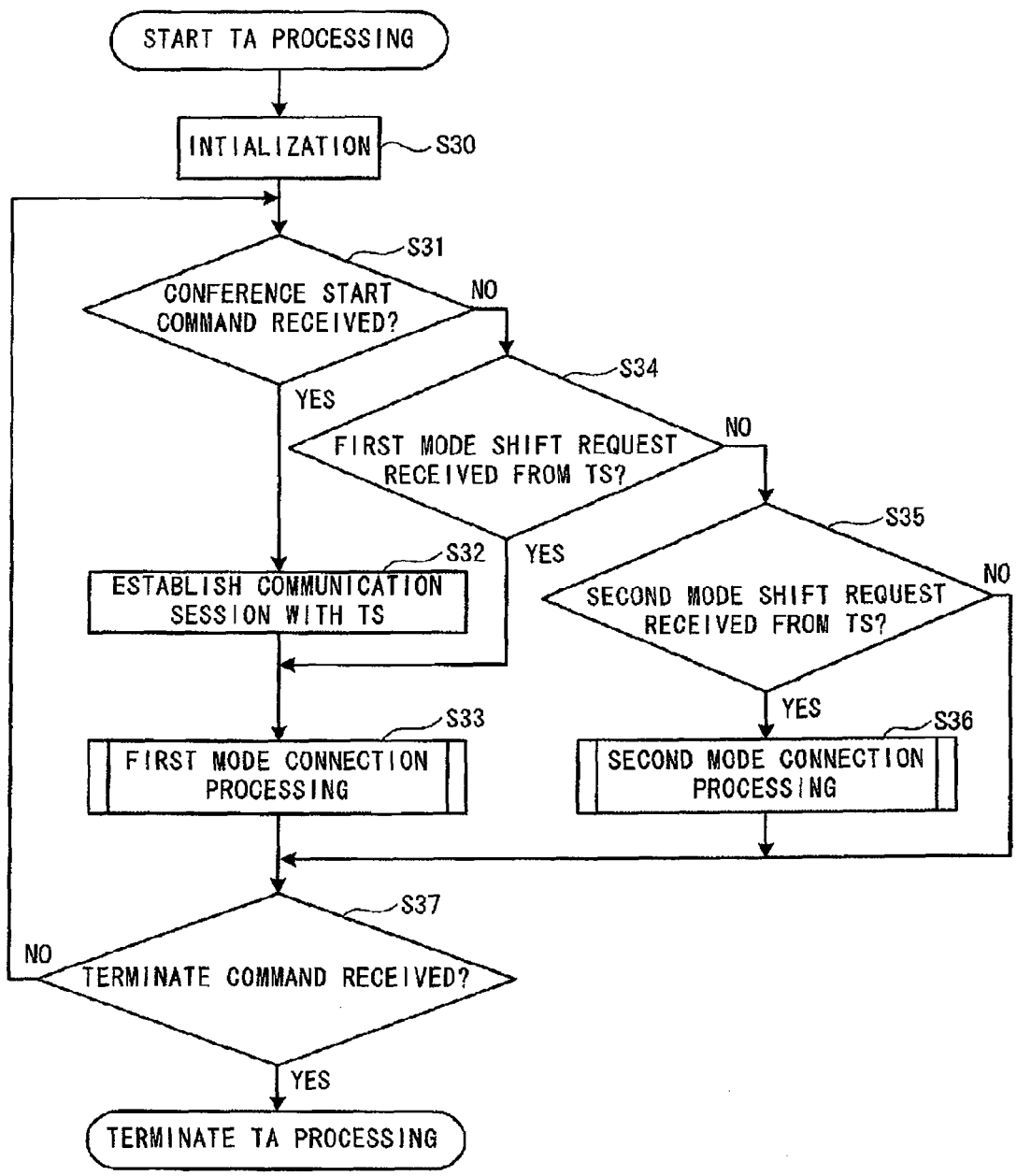
FIG. 10 is a flowchart of main processing in the conference terminal device.

As shown in FIG. 10, in the conference terminal device 2, the CPU in the control portion 101 performs an initialization operation when a main power supply switch (not shown in the drawings) is turned ON and when a reset switch (not shown in the drawings) is operated. The initialization operation involves providing access permission to the storage portion 102, reserving a work area in internal memory, and the like. The CPU in the control portion 101 reads the information processing program that is stored in the non-volatile memory, activates basic functions of the control portion 101 (Step S30), and advances the processing to Step S31.

In the processing at Step S31, the control portion 101 determines whether a conference start command has been received. For example, the control portion 101 determines that a conference start command has been received when a specified operation has been performed on the input portion 109. In a case where it is determined that a conference start command has been received (YES at Step S31), the control portion 101 establishes a communication session between the conference control device 3 and the communication portion 103 and establishes a communication path for control (Step S32). The conference terminal device 2 is able to use the communication path for control to transmit and receive the control data to and from the conference control device 3.

Figure 11:
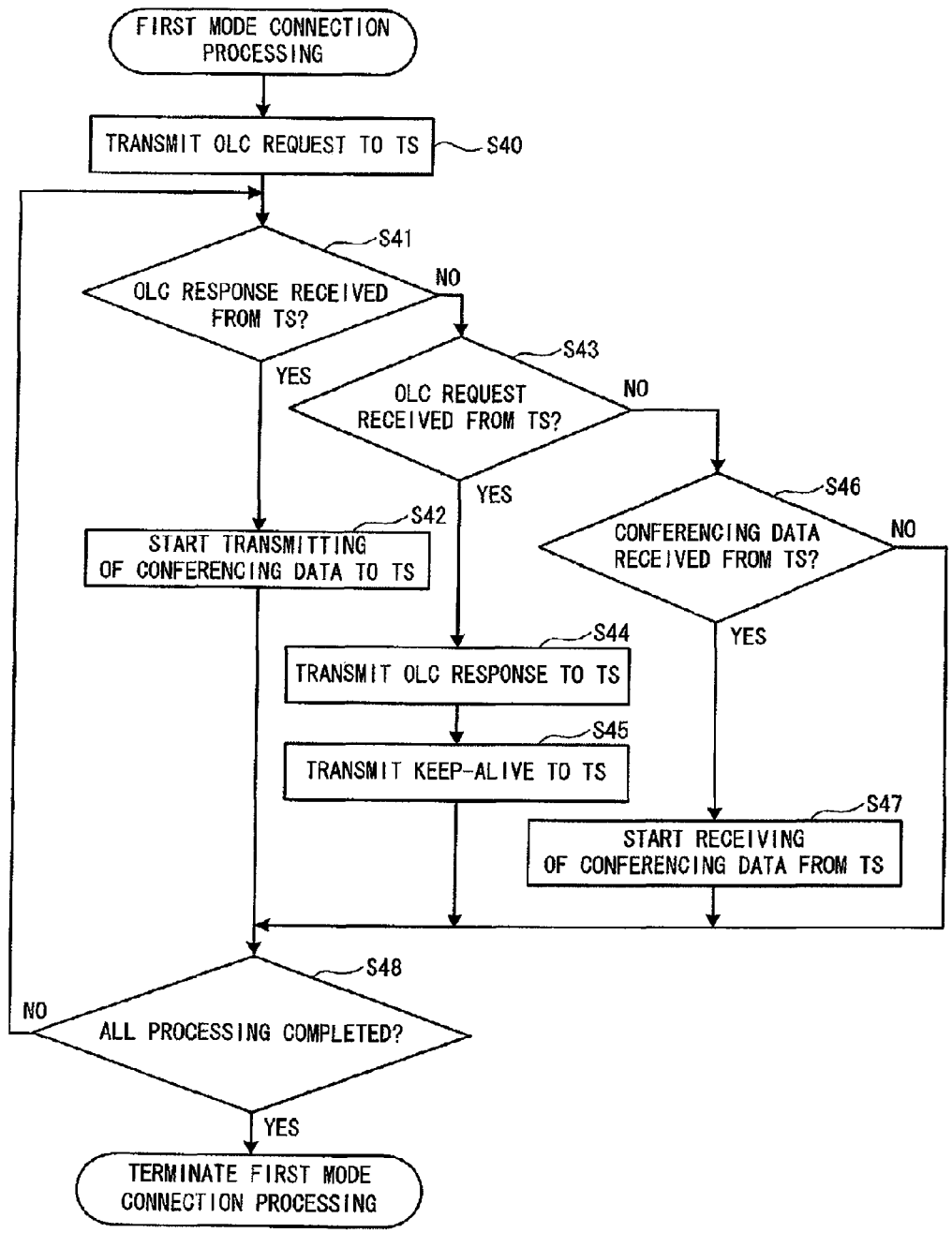
FIG. 11 is a flowchart of first mode connection processing in the conference terminal device.

Next, the control portion 101 performs first mode connection processing (Step S33). The first mode connection processing is the processing at Steps S40 to S48 that is shown in FIG. 11 and will be described later.

In a case where it is determined at Step S31 that a conference start command has not been received (NO at Step S31), the control portion 101 determines whether a first mode shift request has been received from the conference control device 3 through the communication path for control (Step S34). If the control portion 101 determines that a first mode shift request has been received (YES at Step S34), the control portion 101 shifts to the first mode connection processing at Step S33. If the control portion 101 determines that a first mode shift request has not been received (NO at Step S34), the control portion 101 shifts to the processing at Step S35.

Figure 12:
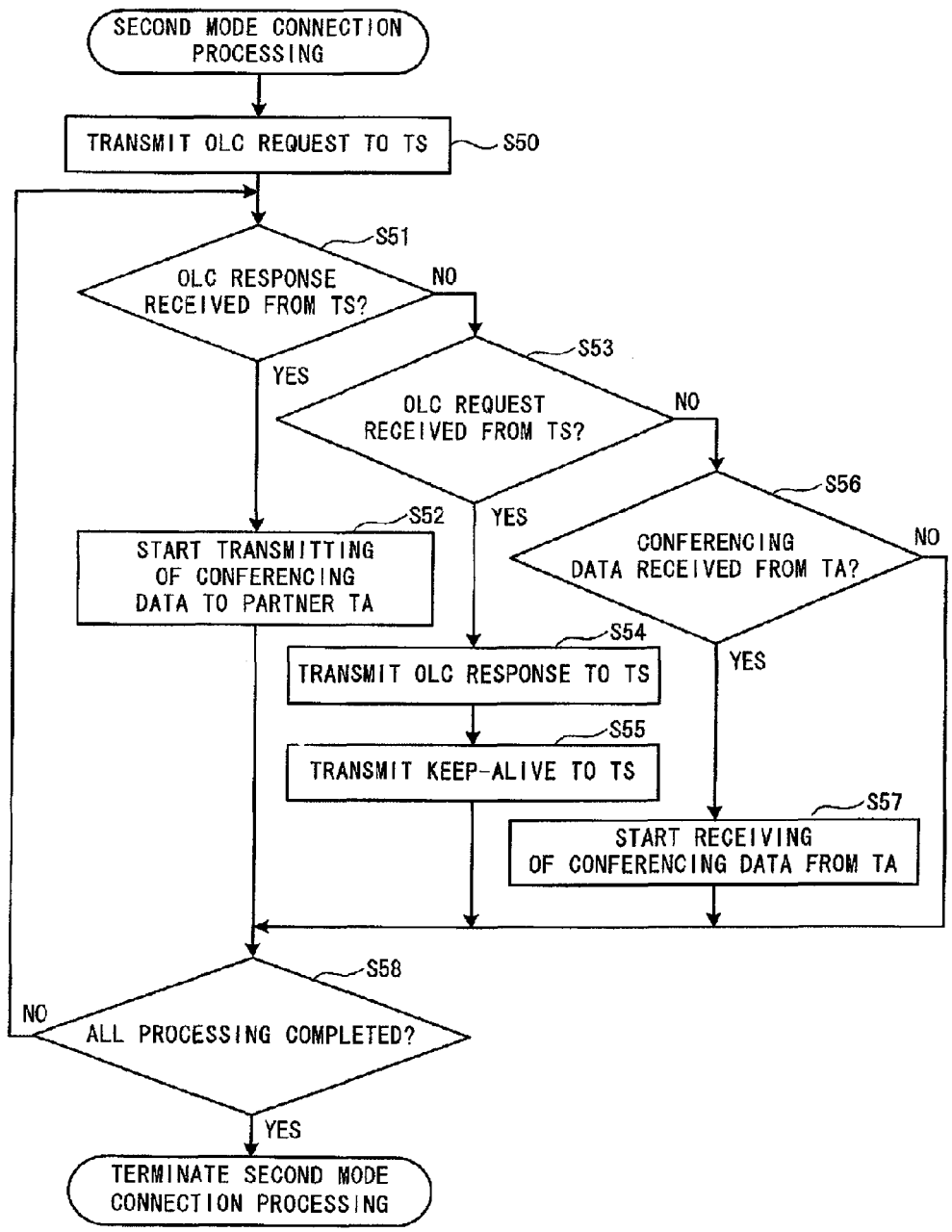
FIG. 12 is a flowchart of second mode connection processing in the conference terminal device.

The control portion 101 determines whether a second mode shift request has been received from the conference control device 3 through the communication path for control (Step S35). If the control portion 101 determines that a second mode shift request has been received (YES at Step S35), the control portion 101 shifts to the processing at Step S36 and performs second mode connection processing. The second mode connection processing is the processing at Steps S50 to S58 that is shown in FIG. 12 and will be described later.

After one of the first mode connection processing (Step S33) and the second mode connection processing (Step S36) has been completed, as well as in a case where it is determined that a second mode shift request has not been received (NO at Step S35), the control portion 101 determines whether a terminate command has been received (Step S37). If the control portion 101 determines that a terminate command has been received (YES at Step S37), the control portion 101 terminates the main processing. If the control portion 101 determines that a terminate command has not been received (NO at Step S37), the control portion 101 returns the processing to Step S31.

Next, the first mode connection processing at Step S33 will be explained with reference to FIG. 11.

Once the first mode connection processing has been started, the control portion 101 transmits an OLC Request packet to the conference control device 3 from the communication portion 103 (Step S40). This OLC Request packet is a control packet that requests that the conference control device 3 call the other conference terminal device 2 that was designated at Step S31.

Next, the control portion 101 determines whether an OLC Response packet from the conference control device 3 has been received by the communication portion 103 (Step S41). This OLC Response packet is a response to the OLC Request packet that was transmitted at Step S40, and it contains a port number for transmitting the conferencing data to the conference control device 3. In a case where it is determined that the OLC Response packet has been received (YES at Step S41), the control portion 101 starts the transmitting of the conferencing data from the communication portion 103 to the conference control device 3, using the destination port number for the conference control device 3 that is contained in the OLC Response packet as the destination port number (Step S42). In a case where it is determined that the OLC Response packet has not been received (NO at Step S41), the control portion 101 determines whether an OLC Request packet from the conference control device 3 has been received by the communication portion 103 (Step S43). This OLC Request packet requests the establishing of a communication path with the conference control device 3, and it contains, in a specified field, information (an IP address, a port number, and the like) on the partner conference terminal device 2 that is the transmission source of the conferencing data.

In a case where it is determined that the OLC Request packet has been received (YES at Step S43), the control portion 101 transmits an OLC Response packet to the conference control device 3 (Step S44). This OLC Response packet is transmitted in a case where the establishing of the communication path with the conference control device 3 has been approved. When the OLC Response packet has been transmitted, the control portion 101 transmits a Keep-Alive packet that is a response packet in which the port number for establishing the communication path with the conference control device 3 is set as the transmission source port number (Step S45).

In a case where it is determined that the OLC Request packet has not been received (NO at Step S43), the control portion 101 determines whether the conferencing data have been transmitted from the conference control device 3 (Step S46). If it is determined that the conferencing data have been transmitted from the conference control device 3 (YES at Step S46), the control portion 101 starts receiving the conferencing data (Step S47). In this manner, the conference terminal device 2 according to the video conference system 1 performs communication in the first mode.

Figure 8:
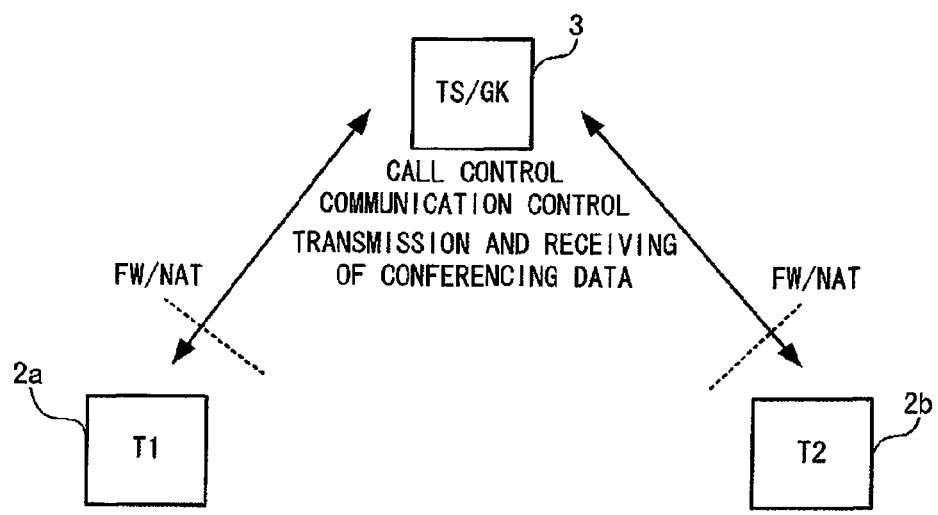
FIG. 8 is an explanatory figure of first mode communication paths in the video conference system.

After one of the processing at Steps S42, S45, and S47 has been completed, as well as in a case where it is determined that the conferencing data have not been transmitted from the conference control device 3 (NO at Step S46), the control portion 101 determines whether all of the processing in the first mode connection processing has been completed (Step S48). For example, in the case of the first conference terminal device 2a that is shown in FIG. 8, in a case where the processing described above at Steps S21, S22, S23', S24', S25', S26, and S27' has been completed, the control portion 101 determines that all of the processing in the first mode connection processing has been completed. If the control portion 101 determines that all of the processing in the first mode connection processing has been completed (YES at Step S48), the control portion 101 terminates the first mode connection processing. If the control portion 101 determines that not all of the processing in the first mode connection processing has been completed (NO at Step S48), the control portion 101 returns the processing to Step S41.

Next, the second mode connection processing at Step S36 will be explained with reference to FIG. 12.

Once the second mode connection processing has been started, the control portion 101 transmits an OLC Request packet to the conference control device 3 from the communication portion 103 (Step S50). This OLC Request packet is a control packet that requests that the conference control device 3 call the other conference terminal device 2 that was designated at Step S31. For example, the first conference terminal device 2a may call the second conference terminal device 2b.

Next, the control portion 101 determines whether an OLC Response packet from the conference control device 3 has been received by the communication portion 103 (Step S51). This OLC Response packet is a response to the OLC Request packet that was transmitted at Step S50. In a case where it is determined that the OLC Response packet has been received (YES at Step S51), the control portion 101 starts the transmitting of the conferencing data from the communication portion 103, using the Keep-Alive packet transmission source port number that is contained in the OLC Response packet as the destination port number (Step S52). Note that this OLC Response packet contains information on the first network 4 side IP address of the IF device 5 that corresponds to the first network 4 side IP address of the other conference terminal device 2 that is the transmission source of the conferencing data. The control portion 101 transmits the conferencing data using this IP address as the destination IP address. In this manner, the transmitting of the conferencing data from the one conference terminal device 2 to the other conference terminal device 2 is started, and the conferencing data are transmitted sequentially.

In a case where it is determined that the OLC Response packet has not been received (NO at Step S51), the control portion 101 determines whether an OLC Request packet from the conference control device 3 has been received by the communication portion 103 (Step S53). In a case where it is determined that the OLC Request packet has been received (YES at Step S53), the control portion 101 transmits an OLC Response packet to the conference control device 3 (Step S54). This OLC Response packet is transmitted in a case where the establishing of the communication path with the partner conference terminal device 2 has been approved. When the OLC Response packet has been transmitted, the control portion 101 next transmits, from the communication portion 103, a Keep-Alive packet that is a response packet in which the port number for establishing the communication path with the conference control device 3 is set as the transmission source port number (Step S55).

In a case where it is determined that the OLC Request packet has not been received (NO at Step S53), the control portion 101 determines whether the conferencing data have been transmitted to the communication portion 103 from the partner conference terminal device 2 that the conference control device 3 was requested to call at Step S50 (Step S56). If it is determined that the conferencing data have been transmitted from the partner conference terminal device 2 (YES at Step S56), the control portion 101 starts the receiving of the conferencing data by the communication portion 103 (Step S57). In this manner, the conference terminal device 2 according to the video conference system 1 performs communication in the second mode.

After one of the processing at Steps S52, S55, and S57 has been completed, as well as in a case where it is determined that the conferencing data have not been transmitted from the conference terminal device 2 (NO at Step S56), the control portion 101 determines whether all of the processing in the second mode connection processing has been completed (Step S58). For example, in the case of the first conference terminal device 2a that is shown in FIG. 5, in a case where the processing described above at Steps S1, S5, S6 (refer to FIG. 2), S12, S13, and S14 (refer to FIG. 4) has been completed, the control portion 101 determines that all of the processing in the second mode connection processing has been completed. If the control portion 101 determines that all of the processing in the second mode connection processing has been completed (YES at Step S58), the control portion 101 terminates the second mode connection processing. If the control portion 101 determines that not all of the processing in the second mode connection processing has been completed (NO at Step S58), the control portion 101 returns the processing to Step S51 and repeats the processing that is described above.

<1.3 Detailed Explanation of Configuration and Operation of the Conference Control Device 3>

Hereinafter, the configuration and operation of the conference control device 3 that is described above will be explained in detail.

Configuration of the Conference Control Device 3

First, the configuration of the conference control device 3 will be explained.

Figure 13:
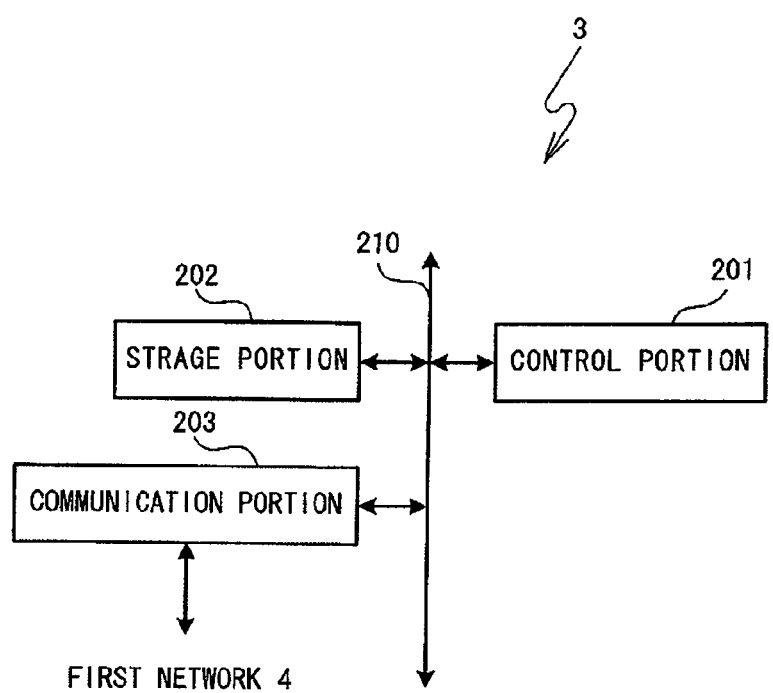
FIG. 13 is a figure the shows a configuration of a conference control device.

A general-purpose server computer can be used for the conference control device 3. As shown in FIG. 13, the conference control device 3 includes a control portion 201, a storage portion 202, and a communication portion 203, which are connected to one another through a system bus 210. The control portion 201 controls the entire conference control device 3. The storage portion 202 stores various types of setting values, default values, and the like that can be rewritten. The communication portion 203 communicates with the conference terminal devices 2 through the first network 4.

The control portion 201 includes a CPU, an internal memory, and the like. An information processing program for transmitting and receiving various types of packets to and from the conference terminal devices 2 is stored in the internal memory. The CPU performs the processing that is described below by reading and executing the information processing program that is stored in the internal memory.

For example, if the conference control device 3 receives an OLC Request packet that is a request packet that requests the establishing of a communication path between one of the conference terminal devices 2 and the other conference terminal device 2, the CPU transmits to the other conference terminal device 2 an OLC Request packet that is a notification request packet that requests notification of a port number for establishing the communication path.

If the conference control device 3 receives a Keep-Alive packet that has been transmitted from the conference terminal device 2 that received the OLC Request packet, the CPU transmits an OLC Response packet to the conference terminal device 2 that requested the establishing of the communication path. This OLC Response packet is a request response packet that contains information on the transmission source port number of the Keep-Alive packet that was transmitted from the conference terminal device 2.

Note that the information processing program may also be downloaded through the communication portion 203 into the internal memory of the control portion 201 from another server that is connected to the first network 4, for example. The information processing program may also be stored in a storage medium such as a CD-ROM or the like and be read into the internal memory of the control portion 201 by a storage medium drive that is not shown in the drawings.

<Operation of the Conference Control Device 3>

The operation of the conference control device 3 that is configured as described above will be explained in detail. Note that the various types of processing that are described below are performed by the control portion 201 of the conference control device 3.

Figure 14:
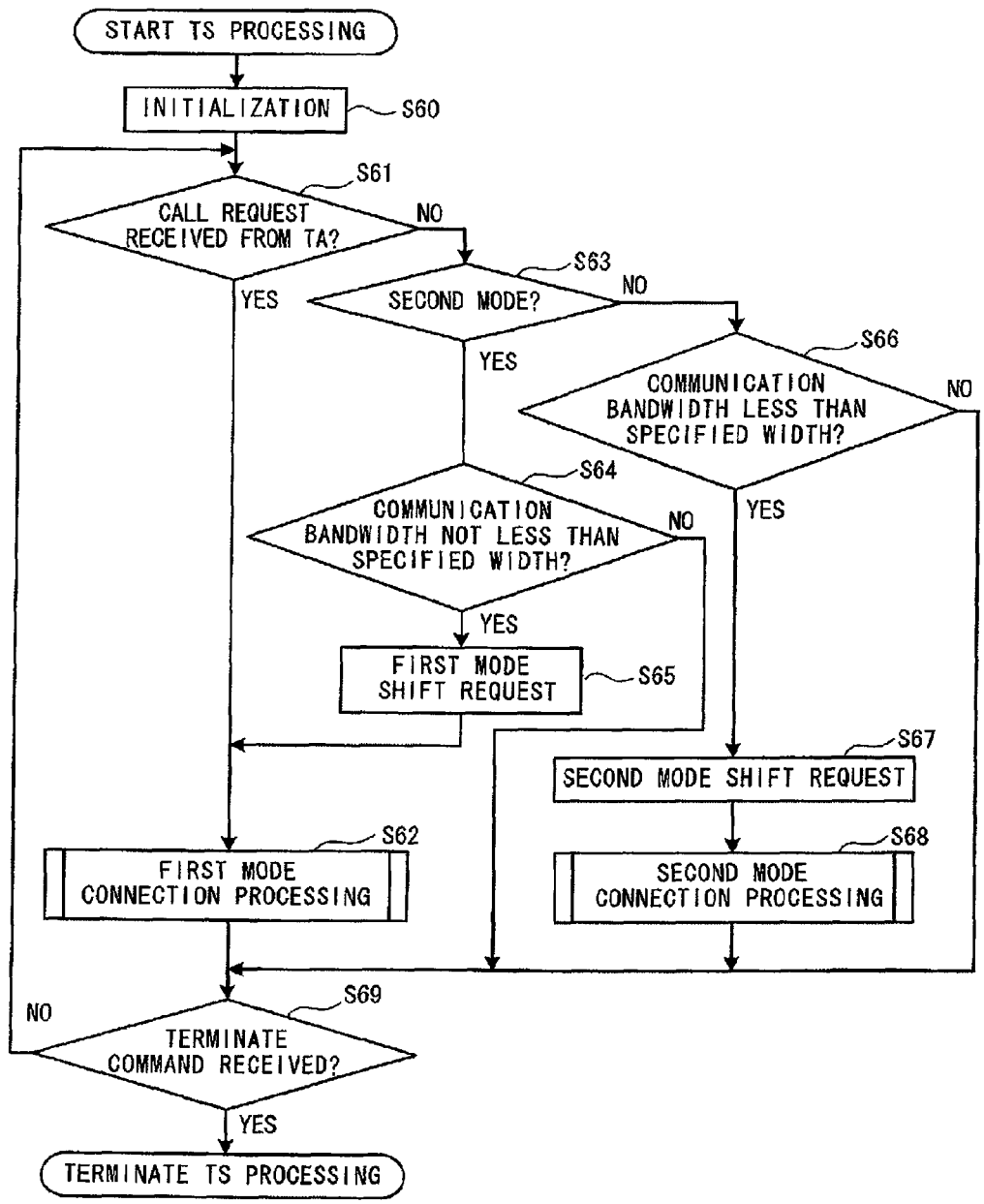
FIG. 14 is a flowchart of main processing in the conference control device.

As shown in FIG. 14, in the conference control device 3, the CPU in the control portion 201 performs an initialization operation when a main power supply switch (not shown in the drawings) is turned ON and when a reset switch (not shown in the drawings) is operated. The initialization operation involves providing access permission to the storage portion 202, reserving a work area in the internal memory, and the like. The CPU in the control portion 201 reads the information processing program, which is stored in a non-volatile memory, activates basic functions of the control portion 201 (Step S60), and advances the processing to Step S61.

Figure 15:
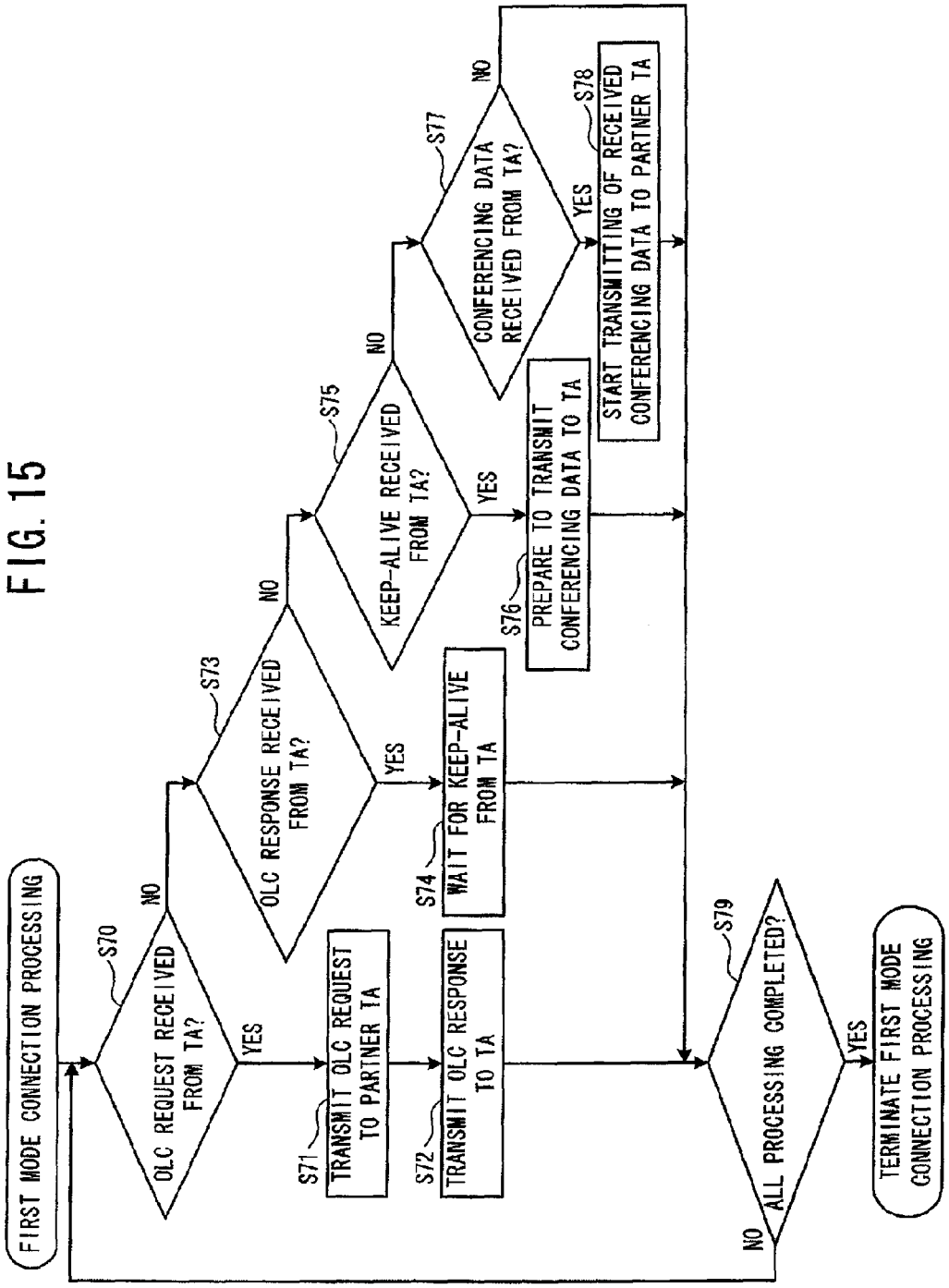
FIG. 15 is a flowchart of first mode connection processing in the conference control device.

In the processing at Step S61, the control portion 201 determines whether a request has been received from one of the conference terminal devices 2 to call the other conference terminal device 2. For example, in a case where a request from the first conference terminal device 2a to call the second conference terminal device 2b has been received by the communication portion 203, the control portion 201 determines that a request to call the other conference terminal device 2 has been received. If the control portion 201 determines that a request to call the other conference terminal device 2 has been received (YES at Step S61), the control portion 201 performs first mode connection processing (Step S62). The first mode connection processing is the processing at Steps S70 to S79 that is shown in FIG. 15, and it will be described in detail later.

If the control portion 201 determines that a request to call the other conference terminal device 2 has not been received (NO at Step S61), the control portion 201 determines whether the current mode for each of the conference terminal devices 2 is the second mode (Step S63). In a case where it is determined that the current mode is the second mode (YES at Step S63), the control portion 201 determines whether the communication bandwidth between the conference terminal devices 2 can be ensured to be not less than a specified width a (Step S64). The determination as to whether the communication bandwidth can be ensured to be not less than the specified width α is made by having the communication portion 203 transmit test data at fixed intervals from the conference control device 3 to each of the conference terminal devices 2, then determining the communication bandwidth based on the communication rate for the test data.

If it is determined that the communication bandwidth can be ensured to be not less than the specified width α (YES at Step S64), the control portion 201 transmits the first mode shift request to each of the conference terminal devices 2 (S65), and performs the first mode connection processing at Step S62 in order to allow the conferencing data to be transmitted and received through the conference control device 3.

Figure 16:
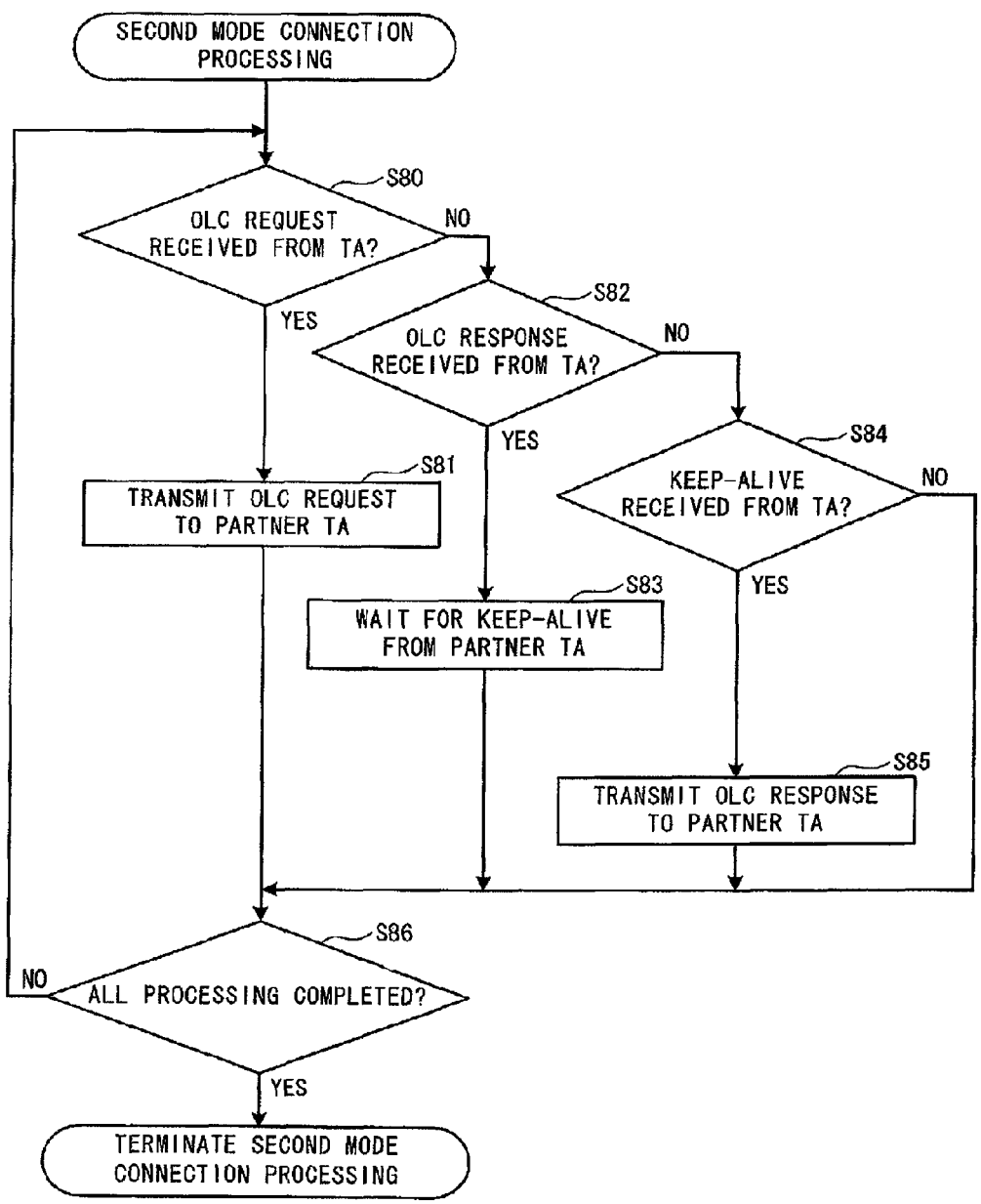
FIG. 16 is a flowchart of second mode connection processing in the conference control device.

If it is determined that the current mode for each of the conference terminal devices 2 is the first mode instead of the second mode (NO at Step S63), the control portion 201 determines whether the communication bandwidth between the conference terminal devices 2 is less than the specified width a (Step S66). If it is determined that the communication bandwidth is less than the specified width a (YES at Step S66), the control portion 201 transmits the second mode shift request to each of the conference terminal devices 2 (S67), and performs second mode connection processing (Step S68). The second mode connection processing is the processing at Steps S80 to S86 that is shown in FIG. 16, and it will be described in detail later.

After one of the processing at Steps S62 and S68 has been completed, as well as in a case where the communication bandwidth cannot be ensured to be not less than the specified width a (NO at Step S64), in a case where it is determined that the communication bandwidth is not less than the specified width a (NO at Step S66), the control portion 201 determines whether a terminate command has been received (Step S69). If the control portion 201 determines that a terminate command has been received (YES at Step S69), the control portion 201 terminates the main processing. If the control portion 201 determines that a terminate command has not been received (NO at Step S69), the control portion 201 returns the processing to Step S61.

Next, the first mode connection processing at Step S62 will be explained with reference to FIG. 15.

Once the first mode connection processing has been started, the control portion 201 determines whether the communication portion 203 has received an OLC Request packet from one of the conference terminal devices 2 (Step S70). If it is determined that the an OLC Request packet has been received (YES at Step S70), the control portion 201 transmits an OLC Request packet from the communication portion 203 to the calling partner conference terminal device 2 that is contained in the OLC Request packet that was received (Step S71). The control portion 201 then transmits an OLC Response packet from the communication portion 203 to the conference terminal device 2 that transmitted the OLC Request packet (Step S72).

If it is determined that an OLC Request packet has not been received (NO at Step S70), the control portion 201 determines whether the communication portion 203 has received an OLC Response packet from one of the conference terminal devices 2 (Step S73). If it is determined that an OLC Response packet has been received (YES at Step S73), the control portion 201 waits for a Keep-Alive packet to be transmitted from the conference terminal device 2 that transmitted the OLC Response packet (Step S74).

If it is determined that an OLC Response packet has not been received (NO at Step S73), the control portion 201 determines whether the communication portion 203 has received a Keep-Alive packet from one of the conference terminal devices 2 (Step S75). If it is determined that a Keep-Alive packet has been received (YES at Step S75), the control portion 201 prepares to transmit the conferencing data to the conference terminal device 2 that transmitted the Keep-Alive packet (Step S76). Note that in a case where the conferencing data have already been received from the partner conference terminal device 2 at this time, the control portion 201 starts the transmitting of the conferencing data to the conference terminal device 2 that transmitted the Keep-Alive packet.

If it is determined that a Keep-Alive packet has not been received (NO at Step S75), the control portion 201 determines whether the conferencing data have been transmitted to the communication portion 203 from one of the conference terminal devices 2 (Step S77). If it is determined that the conferencing data have been transmitted (YES at Step S77), the control portion 201 starts transmitting the received conferencing data to the partner conference terminal device 2 (Step S78). Note that in a case where the communication portion 203 has still not received the Keep-Alive packet from the partner conference terminal device 2 when the conferencing data have been transmitted to the communication portion 203, the control portion 201 starts transmitting the received conferencing data to the partner conference terminal device 2 when the Keep-Alive packet from the partner conference terminal device 2 is received.

After one of the processing at Steps S72, S74, S76, and S78 has been completed, as well as in a case where it is determined that the conferencing data have not been transmitted from one of the conference terminal devices 2 (NO at Step S77), the control portion 201 determines whether all of the processing in the first mode connection processing has been completed (Step S79). Specifically, the control portion 201 determines that all of the processing in the first mode connection processing has been completed in a case where a state has been reached in which each of the conference terminal devices 2 can transmit and receive the conferencing data through the conference control device 3. If the control portion 201 determines that not all of the processing in the first mode connection processing has been completed (NO at Step S79), the control portion 201 returns the processing to Step S70. If the control portion 201 determines that all of the processing in the first mode connection processing has been completed (YES at Step S79), the control portion 201 terminates the first mode connection processing.

Next, the second mode connection processing at Step S68 will be explained with reference to FIG. 16.

Once the second mode connection processing has been started, the control portion 201 determines whether the communication portion 203 has received an OLC Request packet from one of the conference terminal devices 2 (Step S80). If it is determined that the an OLC Request packet has been received (YES at Step S80), the control portion 201 transmits an OLC Request packet from the communication portion 203 to the calling partner conference terminal device 2 that is contained in the OLC Request packet that was received (Step S81).

If it is determined that an OLC Request packet has not been received by the communication portion 203 (NO at Step S80), the control portion 201 determines whether an OLC Response packet has been received from one of the conference terminal devices 2 (Step S82). If it is determined that an OLC Response packet has been received (YES at Step S82), the control portion 201 waits for a Keep-Alive packet to be transmitted from the conference terminal device 2 that transmitted the OLC Response packet (Step S83).

If it is determined that an OLC Response packet has not been received (NO at Step S82), the control portion 201 determines whether a Keep-Alive packet from one of the conference terminal devices 2 has been received by the communication portion 203 (Step S84). If it is determined that a Keep-Alive packet has been received (YES at Step S84), the control portion 201 transmits an OLC Response packet to the partner conference terminal device 2 from the communication portion 203 (Step S85). Note that the conference control device 3, based on the transmission source IP address and the transmission source port number of the Keep-Alive packet, detects the first network 4 side IP address and transmission source port number of the IF device 5 that corresponds to the first network 4 side IP address of the conference terminal device 2 that transmitted the Keep-Alive packet. The conference control device 3 includes that information in the OLC Response packet and transmits the OLC Response packet to the partner conference terminal device 2.

After one of the processing at Steps S81, S83, and S85 has been completed, as well as in a case where it is determined that a Keep-Alive packet has not been received (NO at Step S84), the control portion 201 determines whether all of the processing in the second mode connection processing has been completed (Step S86). Specifically, the control portion 201 determines that all of the processing in the second mode connection processing has been completed when a state has been reached in which each of the conference terminal devices 2 can transmit and receive the conferencing data directly, without going through the conference control device 3. If the control portion 201 determines that not all of the processing in the second mode connection processing has been completed (NO at Step S86), the control portion 201 returns the processing to Step S80. If the control portion 201 determines that all of the processing in the second mode connection processing has been completed (YES at Step S86), the control portion 201 terminates the second mode connection processing.

2. Second Embodiment

Next, a video conference system 10 according to a second embodiment will be explained. The video conference system 10 according to the second embodiment differs from the video conference system 1 according to the first embodiment in that it is able to handle a case in which the transmission of the request response packet to the conference terminal device 2 that transmitted the request packet is delayed. Hereinafter, only the points that differ from the first embodiment will be explained.

A procedure of second mode connection processing in a video conference system 10 according to the second embodiment will be explained with reference to FIGS. 17 and 18. Steps S101, S102, and S104 to S107 in FIG. 17 are the same as Steps S1 to S6 in FIG. 2.

Figure 17:
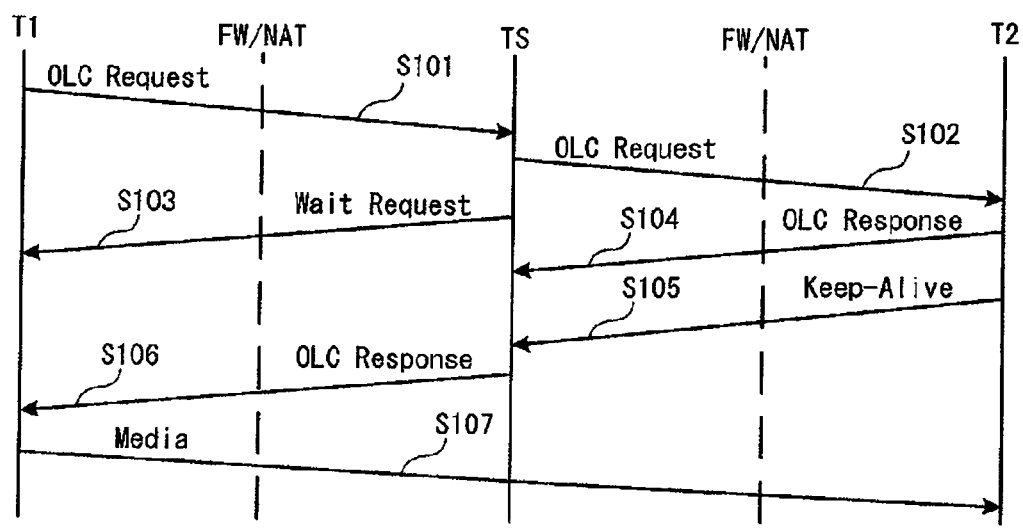
FIG. 17 is a figure that shows a second mode connection processing procedure in a video conference system according to a second embodiment.
Figure 18:
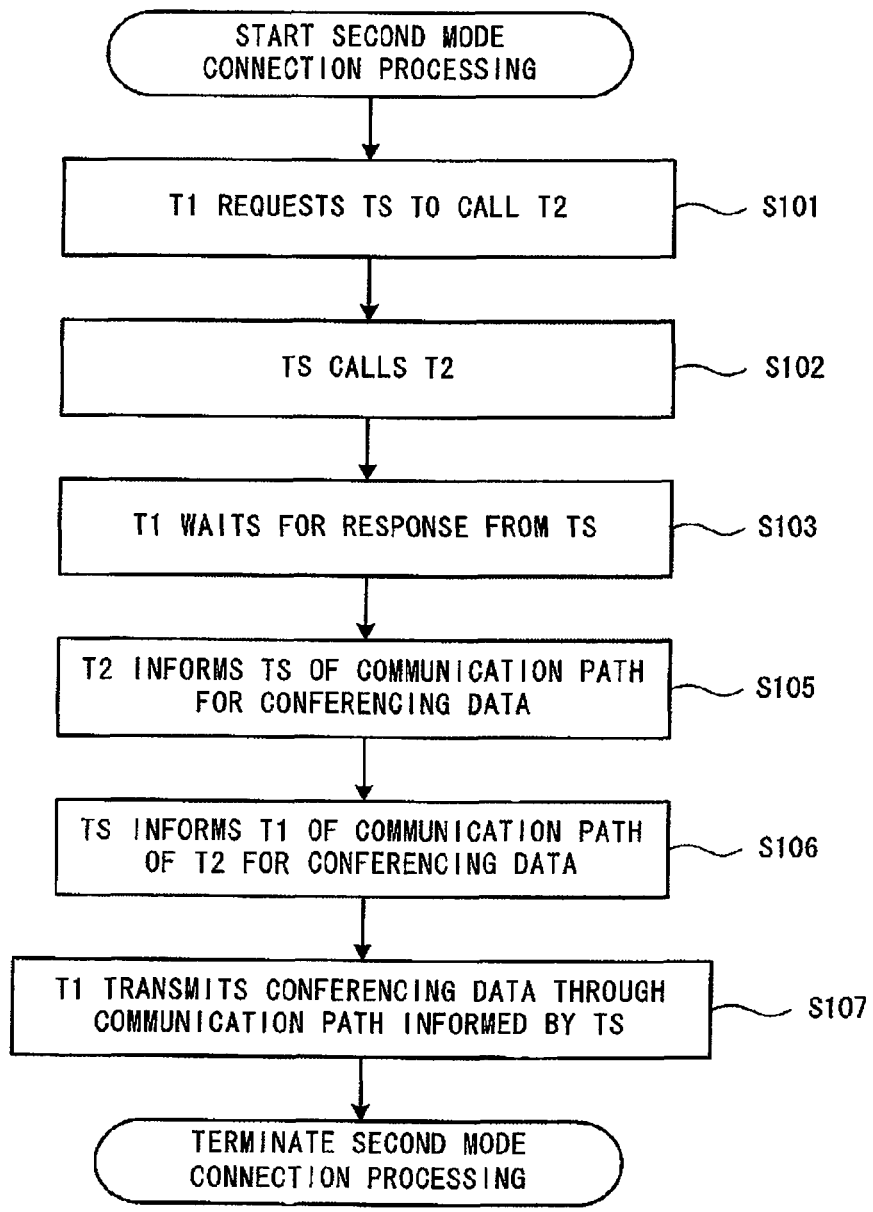
FIG. 18 is a figure that shows the second mode connection processing procedure in the video conference system according to the second embodiment.

As shown in FIGS. 17 and 18, in the video conference system 10, in a case where the conference control device 3 has received an OLC Request packet from one of the conference terminal devices 2 through the communication portion 203 (Step S101), the conference control device 3 transmits a Wait Request packet from the communication portion 203 to the conference terminal device 2 that transmitted the OLC Request packet (Step S103). This Wait Request packet is a response packet that requests that the conference terminal device 2 wait until it receives an OLC Response packet. Upon receiving the Wait Request packet, the conference terminal device 2 waits until an OLC Response packet is received from the conference control device 3 by the communication portion 103. Note that the conference control device 3 transmits the Wait Request packet at fixed intervals until an OLC Response packet is transmitted by the communication portion 203. Every time the conference terminal device 2 receives the Wait Request packet through the communication portion 103, the conference terminal device 2 waits for the OLC Response packet for a fixed period of time.

In this manner, in the video conference system 10, the conference control device 3 transmits, to the conference terminal device 2 that transmitted the request packet, a Wait Request packet that requests that the conference terminal device 2 wait until an OLC Response packet is received. This can prevent communication from being interrupted between the conference control device 3 and the conference terminal device 2 that transmitted the OLC Request packet, even in a case where a long period of time elapses from when the conference terminal device 2 transmitted the OLC Request packet until the OLC Response packet is received. Therefore, it is possible to perform the second mode connection processing even in a case where communication traffic is congested.

3. Third Embodiment

Next, a video conference system 20 according to a third embodiment will be explained. The video conference system 20 according to the third embodiment differs from the video conference system 1 according to the first embodiment in that the conference terminal device 2 that received the OLC Request packet directly transmits the Keep-Alive packet to the conference terminal device 2 that is the communication partner. Hereinafter, only the points that differ from the first embodiment will be explained. Note that in the third embodiment, as in the second embodiment, the conference control device 3 may also transmit the Wait Request packet.

A procedure of second mode connection processing in the video conference system 20 according to the third embodiment will be explained with reference to FIGS. 19 and 20.

Figure 19:
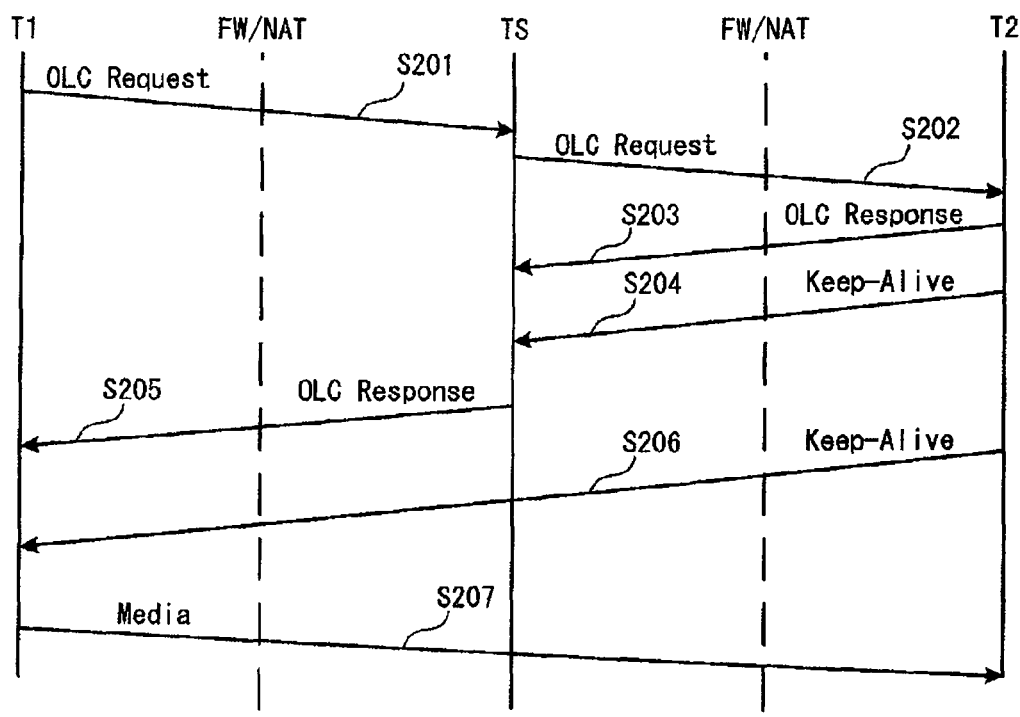
FIG. 19 is a figure that shows a second mode connection processing procedure in a video conference system according to a third embodiment.
Figure 20:
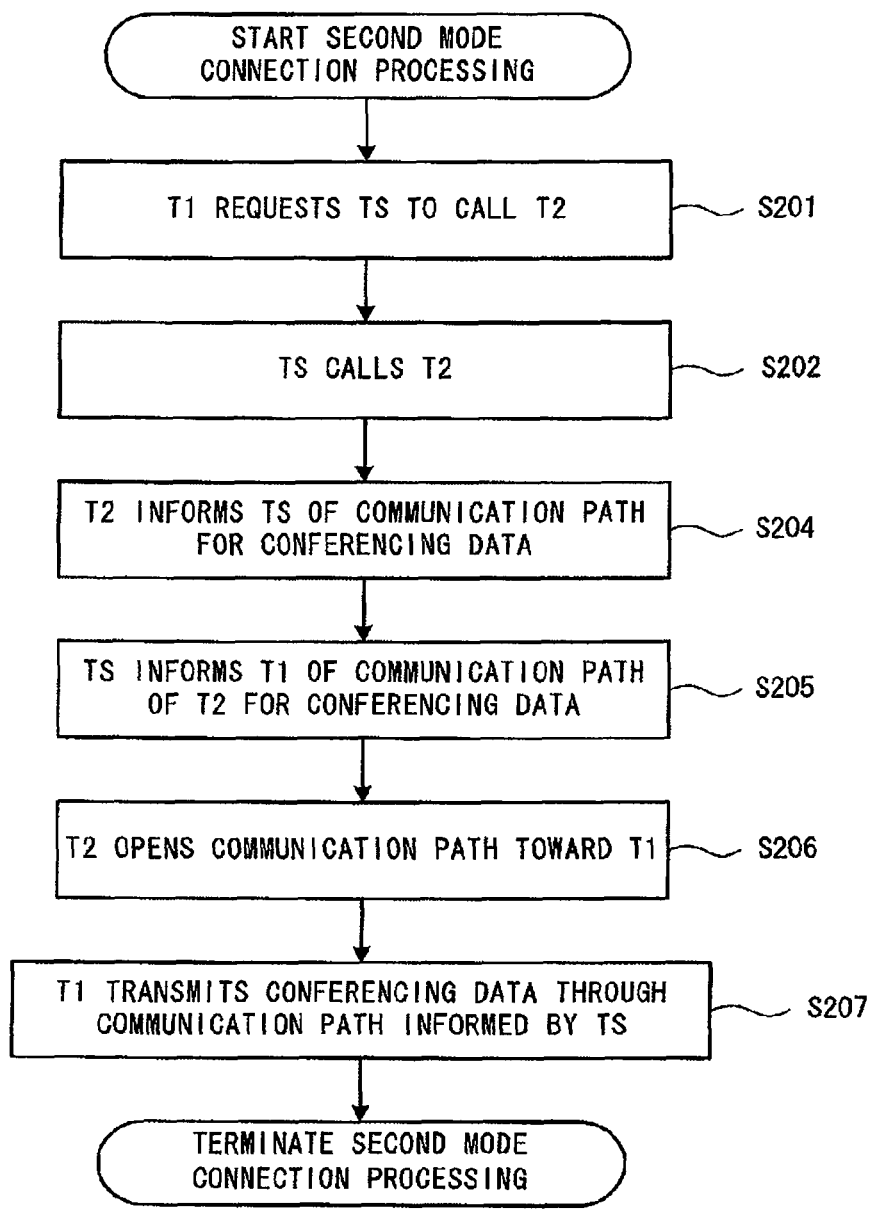
FIG. 20 is a figure that shows the second mode connection processing procedure in the video conference system according to the third embodiment.

As shown in FIGS. 19 and 20, in the video conference system 20 according to the third embodiment, the first conference terminal device 2a transmits an OLC Request packet to the conference control device 3 (Step S201). This OLC Request packet is a request packet that requests the establishing of a communication path with the second conference terminal device 2b.

Upon receiving the OLC Request packet, the conference control device 3 transmits to the second conference terminal device 2b an OLC Request packet that contains information on the transmission source IP address and the transmission source port number of the OLC Request packet from the first conference terminal device 2a (Step S202). The transmission source IP address and the transmission source port number of the OLC Request packet from the first conference terminal device 2a are the first network 4 side IP address and port number that have been converted by the IF device 5a.

Upon receiving the OLC Request packet, the second conference terminal device 2b transmits an OLC Response packet to the conference control device 3 (Step S203). The second conference terminal device 2b then transmits a Keep-Alive packet to the conference control device 3 (Step S204). The conference control device 3 then transmits an OLC Response packet to the first conference terminal device 2a (S205). The second conference terminal device 2b also transmits a Keep-Alive packet to the first conference terminal device 2a (Step S206). In the Keep-Alive packet that is transmitted to the first conference terminal device 2a, the transmission source IP address and the transmission source port number that were contained in the OLC Request packet that was transmitted from the conference control device 3 are defined as the destination IP address and the destination port number, and the port number for establishing the communication path is defined as the transmission source port number.

The Keep-Alive packet that is transmitted to the first conference terminal device 2a at Step S206 causes the FW/NAT of the IF device 5b for the second conference terminal device 2b to associate the second network 6 side IP address and port number of the second conference terminal device 2b with the first network 4 side IP address and port number of the FW/NAT, in the same manner as in the embodiments that are described above.

Figure 21:
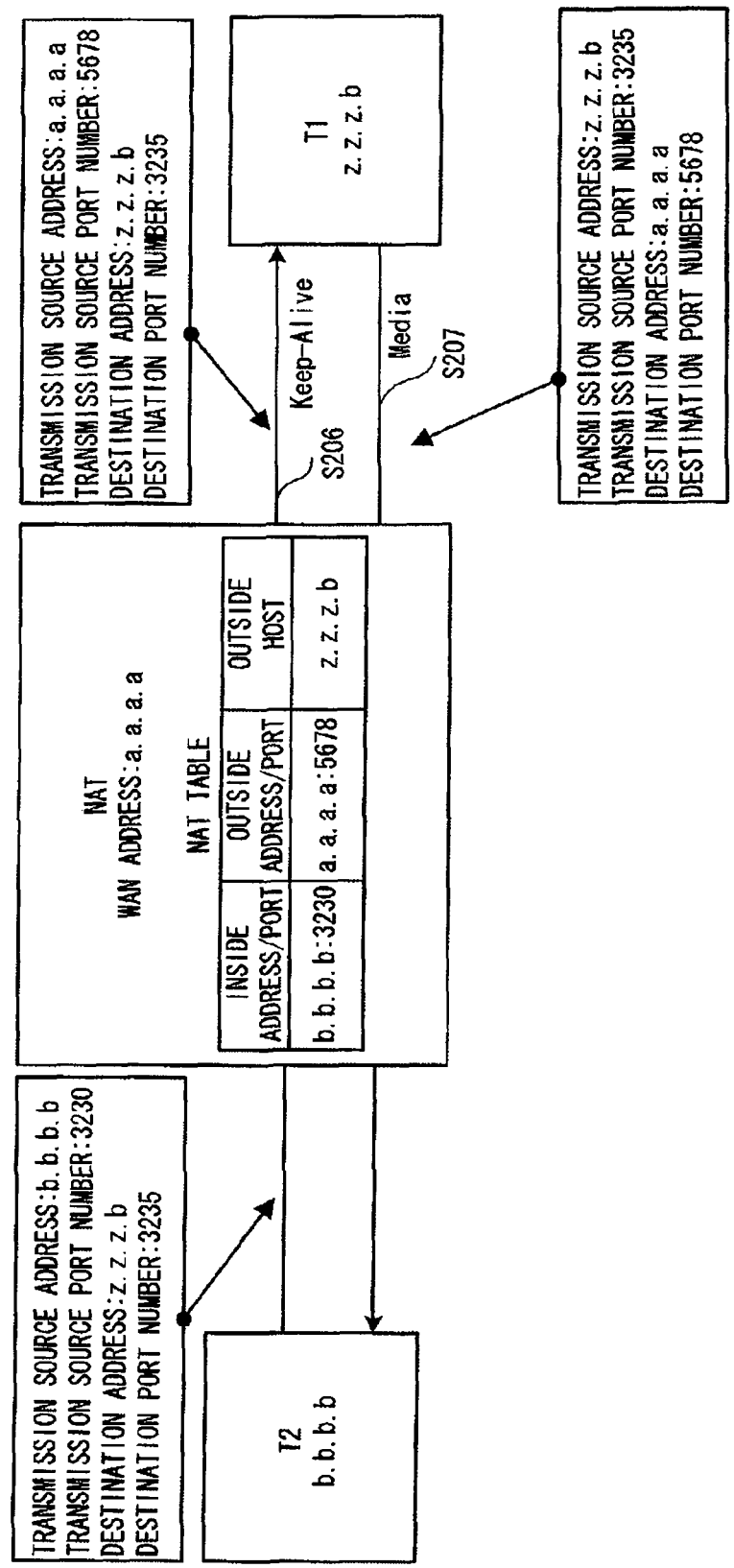
FIG. 21 is an explanatory figure of a NAT table for an interface device according to the third embodiment.

Thus, in the video conference system 20, the Keep-Alive packet is transmitted directly from the conference terminal device 2 that received the OLC Request packet to the communication partner conference terminal device 2. Therefore, even in a case where the NAT function of the IF device 5 is a Restricted Cone NAT, for example, as shown in FIG. 21, the first network 4 side IP address of the communication partner conference terminal device 2 can be registered in the IF device 5, and the conferencing data that are transmitted from the first conference terminal device 2a can be transmitted to the other conference terminal device 2 through the IF device 5.

In a case where the IF device 5 has the function of a Restricted Cone NAT, when the Keep-Alive packet is transmitted to the conference control device 3 from the conference terminal device 2 that is in the same second network 6 as the IF device 5, the IP address of the conference control device 3 is registered in the NAT table in the IF device 5. Therefore, the IF device 5 does not accept access to the conference terminal device 2 from any device other than the conference control device 3.

However, the conference terminal device 2 according to the third embodiment transmits the Keep-Alive packet to the communication partner conference terminal device 2, so the IP address of the communication partner conference terminal device 2 is registered in the NAT table in the IF device 5. Therefore, the conference terminal device 2 accepts access from the communication partner conference terminal device 2 through the IF device 5.

4. Other Embodiments

Figure 22:
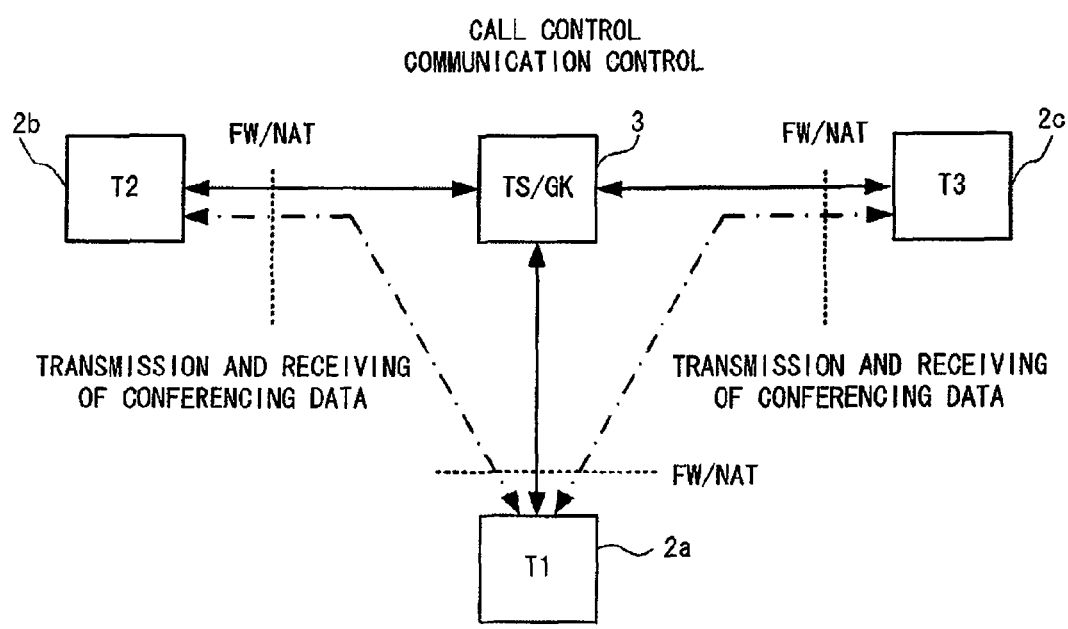
FIG. 22 is an explanatory figure of first mode communication paths in the video conference system according to another embodiment.

In the embodiments that are described above, the transmitting and receiving of the conferencing data between two of the conference terminal devices 2 have been explained, but the transmitting and receiving of the conferencing data can also be performed in the same manner among more than two of the conference terminal devices 2, as shown in FIG. 22.

In a case such as that shown in FIG. 22, for example, where the transmitting and receiving of the conferencing data is performed directly among three conference terminal devices 2a, 2b, 2c (T1, T2, T3 in FIG. 22), the processing may shift to a second mode communication control procedure that is shown in FIG. 23, for example. As shown in FIG. 23, of the three conference terminal devices 2a, 2b, 2c, the conference terminal device 2a transmits an OLC Request packet to the conference control device 3 in order to request the conference control device 3 to call the other conference terminal devices 2b, 2c (Step S301). The conference control device 3 calls the conference terminal devices 2b, 2c by transmitting OLC Request packets to the conference terminal devices 2b, 2c (Step S302). Each of the conference terminal devices 2b, 2c transmits a Keep-Alive packet to the conference control device 3 in which the port number for establishing the communication path is defined as the transmission source port number (Step S303). The conference control device 3 transmits to the conference terminal device 2a OLC Response packets that contain information on the transmission source port numbers of the Keep-Alive packets that were transmitted from the conference terminal devices 2b, 2c, respectively (Step S304). The conference terminal device 2a transmits the conferencing data to each of the conference terminal devices 2b, 2c, using as the destination port numbers the Keep-Alive packet transmission source port numbers that were contained in the OLC Response packets (Step S305).

The present disclosure can also be implemented in other embodiments that make various types of modifications and improvements to the embodiments that are described above. For example, the Keep-Alive packets are transmitted at Steps S4, S105, and S204, using the port number for establishing the communication path as the transmission source port number. The conference control device 3 includes information on the transmission source port number of the Keep-Alive packet in a specified field of the OLC Response packet to provide notification of the transmission source port number to the first conference terminal device 2a. Alternatively, the transmission source port number of the OLC Response packet that is transmitted from the second conference terminal device 2b (Steps S3, S104, S203) can be used as the port number for establishing the communication path.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A conference control device that controls teleconferencing among a plurality of conference terminal devices, the conference control device comprising:
    a data transmission portion that transmits conferencing data that have been transmitted from one of the plurality of conference terminal devices to another of the plurality of conference terminal devices, the conferencing data including at least one of audio data and video data;
    a first notification request portion that, in a case where a first request packet has been received from the one of the conference terminal devices while the conferencing data that have been transmitted from the one of the conference terminal devices are being transmitted to the other of the conference terminal devices by the data transmission portion, transmits a first notification request packet to the other of the conference terminal devices, the first request packet requesting establishing of a first communication path between the one of the conference terminal devices and the other of the conference terminal devices, the first notification request packet requesting notification of a port number for establishing the first communication path; and
    a first request response portion that, in a case where a first response packet has been received from the other of the conference terminal devices, transmits a first request response packet to the one of the conference terminal devices, the first response packet providing the notification of the port number for establishing the first communication path, the first request response packet containing information on a transmission source port number of the first response packet.

2. The conference control device according to claim 1, wherein
    the first notification request portion transmits the first notification request packet in a case where a communication bandwidth between the conference control device and at least one of the conference terminal devices and the other of the conference terminal devices becomes less than a specified width.

3. The conference control device according to claim 2, wherein
    the data transmission portion, in a case where the communication bandwidth has become not less than the specified width while the conferencing data are being transmitted from the one of the conference terminal devices to the other of the conference terminal devices through the first communication path, transmits the conferencing data that have been transmitted from the one of the conference terminal devices to the other of the conference terminal devices.

4. The conference control device according to claim 1, further comprising:
    a wait request portion that, in a case where the first request packet has been received from the one of the conference terminal devices, transmits to the one of the conference terminal devices a wait request packet that requests that the one of the conference terminal devices wait until the one of the conference terminal devices receives the first request response packet.

5. The conference control device according to claim 1, wherein
    the data transmission portion also transmits, to the one of the conference terminal devices, conferencing data that have been transmitted from the other of the conference terminal devices,
    the conference control device further comprising:
    a second notification request portion that, in a case where a second request packet has been received from the other of the conference terminal devices while the conferencing data that have been transmitted from the other of the conference terminal devices are being transmitted to the one of the conference terminal devices by the data transmission portion, transmits a second notification request packet to the one of the conference terminal devices, the second request packet requesting establishing of a second communication path between the other of the conference terminal devices and the one of the conference terminal devices, the second notification request packet requesting notification of a port number for establishing the second communication path; and
    a second request response portion that, in a case where a second response packet has been received from the one of the conference terminal devices, transmits a second request response packet to the other of the conference terminal devices, the second response packet providing the notification of the port number for establishing the second communication path, the second request response packet containing information on a transmission source port number of the second response packet, and wherein the first request response portion and the second request response portion respectively transmit the first request response packet and the second request response packet at the same time.

6. A conference terminal device that is controlled by a conference control device, the conference terminal device comprising:

a data transmission portion that transmits conferencing data to one of the conference control device and another conference terminal device, the conferencing data including at least one of audio data and video data;

a request transmission portion that, in a case where a bandwidth for communication with the conference control device has become less than a specified width while the conferencing data are being transmitted to the conference control device by the data transmission portion, transmits to the conference control device a request packet that requests establishing of a communication path with another conference terminal device; and a first transmission control portion that, in a case where a request response packet has been received from the conference control device in response to the request packet, the request response packet containing information on a transmission source port number from which a response packet has been transmitted to the conference control device from the other conference terminal device, causes the data transmission portion to start the transmission of the conferencing data to the other conference terminal device through the communication path, using the transmission source port number as a destination port number.

7. The conference terminal device according to claim 6, further comprising:

a second transmission control portion that, in a case where the communication bandwidth has become not less than the specified width while the conferencing data are being transmitted through the communication path to the other conference terminal device by the data transmission portion, causes the data transmission portion to start the transmission of the conferencing data to the conference control device.

8. The conference terminal device according to claim 6, further comprising:

a response transmission portion that, in a case where a notification request packet that requests notification of a port number for establishing the communication path has been received from the conference control device, transmits a response packet to the conference control device, using the port number for establishing the communication path as the transmission source port number.

9. The conference terminal device according to claim 8, further comprising:

a port number notification portion that, in a case where the notification request packet has been received from the conference control device, transmits a packet to another conference terminal device that has transmitted a request packet, using the port number for establishing the communication path as the transmission source port number.

10. A teleconference system that includes a plurality of conference terminal devices and a conference control device that controls teleconferencing among the plurality of conference terminal devices, wherein each of the plurality of conference terminal devices includes:

a first data transmission portion that transmits conferencing data to one of the conference control device and another of the conference terminal devices, the conferencing data including at least one of audio data and video data;

a first request transmission portion that, in a case where a bandwidth for communication with the conference control device has become less than a specified width while the conferencing data are being transmitted to the conference control device by the first data transmission portion, transmits to the conference control device a first request packet that requests establishing of a first communication path with another of the conference terminal devices; and a first transmission control portion that, in a case where a first request response packet has been received from the conference control device in response to the first request packet, the first request response packet containing information on a transmission source port number from which a first response packet has been transmitted to the conference control device from the other of the conference terminal devices, causes the first data transmission portion to start the transmission of the conferencing data to the other of the conference terminal devices through the first communication path, using the transmission source port number as a destination port number, and the conference control device includes:

a second data transmission portion that transmits the conferencing data that have been transmitted from one of the plurality of conference terminal devices to another of the plurality of conference terminal devices;

a first notification request portion that, in a case where the first request packet has been received from the one of the conference terminal devices, transmits to the other of the conference terminal devices a first notification request packet that requests notification of a port number for establishing the first communication path; and a first request response portion that, in a case where the first response packet that provides the notification of the port number for establishing the first communication path has been received from the other of the conference terminal devices, transmits the first request response packet to the one of the conference terminal devices.

11. The teleconference system according to claim 10, wherein each of the plurality of conference terminal devices further includes a second transmission control portion that, in a case where the communication bandwidth has become not less than the specified width while the conferencing data are being transmitted through the first communication path to the other of the conference terminal devices by the first data transmission portion, causes the first data transmission portion to start the transmission of the conferencing data to the conference control device.

12. The teleconference system according to claim 10, wherein the conference control device further includes a wait request portion that, in a case where the first request packet has been received from the one of the conference terminal devices, transmits to the one of the conference terminal devices a wait request packet that requests that the one of the conference terminal devices wait until the one of the conference terminal devices receives the first request response packet.

13. The teleconference system according to claim 10, wherein
each of the plurality of conference terminal devices further includes a first response transmission portion that, in a case where the first notification request packet has been received from the conference control device, transmits the first response packet to the conference control device, using the port number for establishing the first communication path as the transmission source port number.

14. The teleconference system according to claim 13, wherein
each of the plurality of conference terminal devices further includes a port number notification portion that, in a case where the first notification request packet has been received from the conference control device, transmits a packet to another of the conference terminal devices that has transmitted a first request packet, using the port number for establishing the first communication path as the transmission source port number.

15. The teleconference system according to claim 10, wherein
the second data transmission portion of the conference control device also transmits, to the one of the conference terminal devices, conferencing data that have been transmitted from the other of the conference terminal devices,
the conference control device further includes:
a second notification request portion that, in a case where a second request packet has been received from the other of the conference terminal devices while the conferencing data that have been transmitted from the other of the conference terminal devices are being transmitted to the one of the conference terminal devices by the second data transmission portion, transmits a second notification request packet to the one of the conference terminal devices, the second request packet requesting establishing of a second communication path between the other of the conference terminal devices and the one of the conference terminal devices, the second notification request packet requesting notification of a port number for establishing the second communication path; and
a second request response portion that, in a case where a second response packet has been received from the one of the conference terminal devices, transmits a second request response packet to the other of the conference terminal devices, the second response packet providing the notification of the port number for establishing the second communication path, the second request response packet containing information on a transmission source port number of the second response packet,
wherein the first request response portion and the second request response portion respectively transmit the first request response packet and the second request response packet at the same time, and
each of the plurality of conference terminal devices further includes:
a first response transmission portion that, in a case where the first notification request packet has been received from the conference control device, transmits the first response packet to the conference control device, using the port number for establishing the first communication path as the transmission source port number; and
a second response transmission portion that, in a case where the second notification request packet has been received from the conference control device, transmits the second response packet to the conference control device, using the port number for establishing the second communication path as the transmission source port number.

* * * * *